United States Patent
Kim et al.

(10) Patent No.: US 8,964,140 B2
(45) Date of Patent: Feb. 24, 2015

(54) LIQUID CRYSTAL DISPLAY

(71) Applicant: Samsung Display Co., Ltd., Yongin, Gyeonngi-Do (KR)

(72) Inventors: Sung-Woon Kim, Suwon-si (KR);
Hee-Seop Kim, Hwaseong-si (KR);
Hyang-Yul Kim, Hwaseong-si (KR);
Joo-Nyung Jang, Gyeongsan-si (KR);
Chong-Chul Chai, Seoul (KR);
Mee-Hye Jung, Suwon-si (KR);
Hwa-Sung Woo, Suwon-si (KR); Cheol Shin, Hwaseong-si (KR); Dong-Chul Shin, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/845,823

(22) Filed: Mar. 18, 2013

(65) Prior Publication Data

US 2013/0215344 A1    Aug. 22, 2013

Related U.S. Application Data

(62) Division of application No. 12/685,400, filed on Jan. 11, 2010, now Pat. No. 8,427,594.

(30) Foreign Application Priority Data

May 19, 2009   (KR) .................. 10-2009-0043720

(51) Int. Cl.
  *G02F 1/141*   (2006.01)
  *G02F 1/1343*  (2006.01)
  *G02F 1/1362*  (2006.01)

(52) U.S. Cl.
  CPC ...... *G02F 1/134309* (2013.01); *G02F 1/13624* (2013.01); *G02F 1/136213* (2013.01); *G02F 1/136286* (2013.01); *G02F 2201/124* (2013.01)
  USPC .............................. 349/41; 349/37; 349/151

(58) Field of Classification Search
  USPC .............................................. 349/41, 37, 151
  See application file for complete search history.

(56) References Cited

U.S. PATENT DOCUMENTS 7,138,656 B2 * 11/2006 Yu et al. .......................... 257/59
7,354,807 B2 *  4/2008 Yu et al. ....................... 438/149

(Continued)

FOREIGN PATENT DOCUMENTS

CN     1900777 A     1/2007
CN     1967334 A     5/2007

(Continued)

*Primary Examiner* — Kaveh Kianni
(74) *Attorney, Agent, or Firm* — Cantor Colburn LLP

(57) ABSTRACT

A liquid crystal display includes: a first substrate and a second substrate disposed opposite the first substrate; a liquid crystal layer interposed between the first and second substrates and including liquid crystal molecules; a gate line which transmits a gate signal; first and second data lines which respectively transmit first and second data voltages, the first and second data voltages having opposite polarities; a first switching element connected to the gate line and the first data line; a second switching element connected to the gate line and the second data line; a first subpixel electrode connected to the first switching element; and a second subpixel electrode connected to the second switching element. The first and second subpixel electrodes overlap portions of the first and second data lines. The first and second subpixel electrodes include first and second branches, respectively, which are alternately arranged between the first and second data lines.

17 Claims, 15 Drawing Sheets

(56) References Cited

U.S. PATENT DOCUMENTS

| | | | |
|---|---|---|---|
| 7,889,183 B2 * | 2/2011 | Lee et al. | 345/173 |
| 8,045,083 B2 * | 10/2011 | Jung et al. | 349/48 |
| 8,081,282 B2 * | 12/2011 | Lee et al. | 349/144 |
| 8,089,598 B2 * | 1/2012 | Kim et al. | 349/149 |
| 8,169,559 B2 * | 5/2012 | Woo et al. | 349/41 |
| 8,199,301 B2 * | 6/2012 | Oh et al. | 349/141 |
| 2002/0080109 A1 * | 6/2002 | Nagata et al. | 345/92 |
| 2003/0090448 A1 | 5/2003 | Tsumura et al. | |
| 2006/0022202 A1 * | 2/2006 | Yu et al. | 257/72 |
| 2006/0146242 A1 * | 7/2006 | Kim et al. | 349/129 |
| 2007/0013854 A1 * | 1/2007 | Yoo et al. | 349/143 |
| 2007/0029552 A1 * | 2/2007 | Yu et al. | 257/59 |
| 2007/0046650 A1 * | 3/2007 | Lee et al. | 345/173 |
| 2007/0182902 A1 * | 8/2007 | Chung et al. | 349/129 |
| 2007/0296883 A1 * | 12/2007 | Kwon et al. | 349/43 |
| 2008/0068524 A1 * | 3/2008 | Kim | 349/38 |
| 2008/0136992 A1 * | 6/2008 | Kim | 349/48 |
| 2008/0239181 A1 * | 10/2008 | Jin | 349/38 |
| 2008/0273131 A1 * | 11/2008 | Kim | 349/38 |
| 2009/0135322 A1 * | 5/2009 | Kim et al. | 349/37 |
| 2009/0256985 A1 * | 10/2009 | Jung et al. | 349/48 |
| 2009/0310048 A1 * | 12/2009 | Shin et al. | 349/38 |
| 2010/0182522 A1 * | 7/2010 | Woo et al. | 349/37 |
| 2010/0283057 A1 * | 11/2010 | Chiu et al. | 257/59 |
| 2012/0154320 A1 * | 6/2012 | Ma et al. | 345/173 |

FOREIGN PATENT DOCUMENTS

| | | |
|---|---|---|
| CN | 101295115 A | 10/2008 |
| JP | 2003131636 A | 5/2003 |
| JP | 2005300780 A | 10/2005 |

* cited by examiner

LIQUID CRYSTAL DISPLAY

CROSS REFERENCE TO RELATED APPLICATIONS

This application is a divisional of U.S. patent application Ser. No. 12/685,400, filed on Jan. 11, 2010, which claims priority to Korean Patent Application No. 10-2009-0043720, filed on May 19, 2009, and all the benefits accruing therefrom under 35 U.S.C. §119, the content of which in its entirety is herein incorporated by reference.

BACKGROUND OF THE INVENTION (1) Field of the Invention

The present invention relates to a liquid crystal display.

(2) Description of the Related Art

A liquid crystal display ("LCD") is a widely used type of flat panel display ("FPD"). The LCD typically includes two display panels, on which field generating electrodes are disposed, and a liquid crystal layer interposed between the two display panels. A voltage is applied to the field generating electrodes to generate an electric field in the liquid crystal layer. The electric filed determines orientations of liquid crystal molecules in the liquid crystal layer, and controls polarization of incident light to display an image.

A display quality of the LCD is improved by, for example, increasing a contrast ratio, a viewing angle and/or a response speed of the LCD.

However, when a pixel electrode overlaps a signal line, such as to increase the aperture ratio of the LCD, for example, a parasitic capacitance between the signal line and the pixel electrode is increased, and the display quality is thereby substantially decreased due to crosstalk.

BRIEF SUMMARY OF THE INVENTION

An exemplary embodiment of a liquid crystal display according to the present invention includes: a first substrate and a second substrate disposed opposite the first substrate; a liquid crystal layer interposed between the first substrate and the second substrate and including liquid crystal molecules; a gate line disposed on the first substrate and which transmits a gate signal; a first data line disposed on the first substrate and which transmits a first data voltage; a second data line disposed on the first substrate and which transmits a second data voltage; a first switching element connected to the gate line and the first data line; a second switching element connected to the gate line and the second data line; and a first subpixel electrode connected to the first switching element and a second subpixel electrode connected to the second switching element, where a polarity of the first data voltage with respect to a reference voltage is opposite to a polarity of the second data voltage with respect to the reference voltage, the first subpixel electrode overlaps a first portion of the first data line and a first portion of the second data line, the second subpixel electrode overlaps a second portion of the first data line and a second portion of the second data line, the first subpixel electrode includes first branches, the second subpixel electrode includes second branches, and the first branches and the second branches are alternately arranged between the first data line and the second data line.

An overlapping area of the first subpixel electrode and the first data line may be substantially equal to an overlapping area of the first subpixel electrode and the second data line, and an overlapping area of the second subpixel electrode and the first data line may be substantially equal to an overlapping area of the second subpixel electrode and the second data line.

The first subpixel electrode may include a first upper portion disposed above the gate line a first lower portion disposed below the gate line and the second subpixel electrode may include a second upper portion disposed above the gate line and a second lower portion disposed below the gate line. The first portion of the first data line may be in one of the first upper portion and the first lower portion of the first subpixel electrode, and the first portion of the second data line may be in the other of the first upper portion and the first lower portion of the first subpixel electrode. The second portion of the first data line may be in one of the second upper portion and the second lower portion of the second subpixel electrode, and the second portion of the second data line may be in the other of the second upper portion and the second lower portion of the second subpixel electrode.

The liquid crystal display may further include a passivation layer disposed on the first substrate between the first switching element and the second switching element, where the passivation layer may include a first contact hole formed therein which exposes an output terminal of the first switching element and a second contact hole formed therein which exposes an output terminal of the second switching elements, the first upper portion of the first subpixel electrode, the first lower portion of the first subpixel electrode and the first switching element may be connected through the first contact hole, and the second upper portion of the second subpixel electrode, the second lower portion of the second subpixel electrode and the second switching element may be connected through the second contact hole.

The passivation layer may include a third contact hole formed therein which further exposes the output terminal of the first switching element, one of the first upper portion and the first lower portion of the first subpixel electrode may be connected to the first switching element through the first contact hole, and the other one of the first upper portion and the first lower portion of the first subpixel electrode may be connected to the output terminal of the first switching element through the third contact hole.

The liquid crystal display may further include a storage electrode disposed on a same layer of the first substrate on which the gate line is disposed, a first storage conductor extending from the output terminal of the first switching element, and a second storage conductor extending from the output terminal of the second switching element, where the first storage conductor and the second storage conductor may overlap the storage electrode and form a first storage capacitor and a second storage capacitor, respectively.

The liquid crystal display may further include an insulating layer and a semiconductor layer disposed on the first substrate between the first storage conductor and the storage electrode, and between the second storage conductor and the storage electrode.

An overlapping area of the first storage conductor and the storage electrode may be substantially equal to an overlapping area of the second storage conductor and the storage electrode.

The first subpixel electrode may include a first upper portion disposed above the gate line and a first lower portion disposed below the gate line and the second subpixel electrode may include a second upper portion disposed above the gate line and a second lower portion disposed below the gate line. The first portion of the first data line and the first portion of the second data line may be in one portion of the first upper portion and the first lower portion of the first subpixel electrode, and the second portion of the first data line and the second portion of the second data line may be in one portion of the second upper portion and the second lower portion of the second subpixel electrode.

The liquid crystal display may further include a passivation layer disposed on the first substrate between the first switching element and the second switching element, where the passivation layer may include a first contact hole formed therein which exposes an output terminal of the first switching element and a second contact hole formed therein which exposes an output terminal of the second switching elements, the first upper portion of the first subpixel electrode, the first lower portion of the first subpixel electrode and the first switching element may be connected through the first contact hole, and the second upper portion of the second subpixel electrode, the second lower portion of the second subpixel electrode and the second switching element may be connected through the second contact hole.

The liquid crystal display may further include a storage electrode disposed on a same layer of the first substrate on which the gate line is disposed, a first storage conductor extending from the output terminal of the first switching element, and a second storage conductor extending from the output terminal of the second switching element, where the first storage conductor and the second storage conductor may overlap the storage electrode, and form a first storage capacitor and a second storage capacitor, respectively.

The first contact hole may be disposed on the first storage conductor, and the second contact hole may be disposed on the second storage conductor.

The liquid crystal display may further include an insulating layer and a semiconductor layer disposed on the first substrate between the first storage conductor and the storage electrode, and between the second storage conductor and the storage electrode.

An overlapping area of the first storage conductor and the storage electrode may be substantially equal to an overlapping area of the second storage conductor and the storage electrode.

The liquid crystal layer may include liquid crystals with positive dielectric anisotropy, and the liquid crystals of the liquid crystal layer may be substantially vertically aligned.

The first branches of the first subpixel electrode and the second branches of the second subpixel electrode may be arranged substantially obliquely with respect to the gate line.

The first subpixel electrode and the second subpixel electrode may be disposed on a same layer of the first substrate.

An exemplary embodiment of a liquid crystal display according to the present invention includes: a first substrate and a second substrate disposed opposite the first substrate; a liquid crystal layer interposed between the first substrate and the second substrate and including liquid crystal molecules; a gate line disposed on the first substrate and which transmits a gate signal; a common voltage line disposed on the first substrate and which transmits a common voltage; a first data line disposed on the first substrate and which transmits a data voltage; a first switching element connected to the gate line and the first data line; a second switching element connected to the gate line and the common voltage line; and a first subpixel electrode connected to the first switching element and a second subpixel electrode connected to the second switching element, where the first subpixel electrode overlaps a first portion of the first data line, the second subpixel electrode overlaps a second portion of the first data line, the first subpixel electrode includes first branches and the second subpixel electrode includes second branches, the first branches and the second branches are alternately arranged, and an overlapping area of the first subpixel electrode and the first data line is substantially equal to an overlapping area of the second subpixel electrode and the first data line.

The liquid crystal display may further include a second data line disposed on the first substrate and which transmits the data voltage, where the first subpixel electrode may overlap a first portion of the second data line and the second subpixel electrode may overlap the second portion of the second data line.

An overlapping area of the first subpixel electrode and the second data line may be substantially equal to an overlapping area of the second subpixel electrode and the second data line.

The liquid crystal display may further include: a storage electrode disposed on a same layer of the first substrate on which the gate line is disposed; a first storage conductor extending from the output terminal of the first switching element; and a second storage conductor extending from the output terminal of the second switching element, wherein the first storage conductor and the second storage conductor may overlap the storage electrode and form a first storage capacitor and a second storage capacitor, respectively, and the first storage conductor and the second storage conductor may overlap the common voltage lines and form a third storage capacitor and a fourth storage capacitor, respectively.

The liquid crystal display may further include an insulating layer and a semiconductor layer disposed on the first substrate between the first storage conductor and the storage electrode, between the second storage conductor and the storage electrode, between the first storage conductor and the common voltage line, and between the second storage conductor and the common voltage line.

An overlapping area of the first storage conductor and the storage electrode may be substantially equal to an overlapping area of the second storage conductor and the storage electrode, and an overlapping area of the first storage conductor and the common voltage line may be substantially equal to an overlapping area of the second storage conductor and the common voltage line.

A liquid crystal display according to an exemplary embodiment of the present invention increases a contrast ratio and a viewing angle, a response speed of the liquid crystal molecule, and an aperture ratio. A crosstalk generated by the parasitic capacitance between the signal line and the pixel electrode is effectively prevented.

BRIEF DESCRIPTION OF THE DRAWINGS

The above and other aspects, advantages and features of the present invention will become more readily apparent by describing in further detail exemplary embodiments thereof with reference to the accompanying drawings, in which.

DETAILED DESCRIPTION OF THE INVENTION

Figure 1:
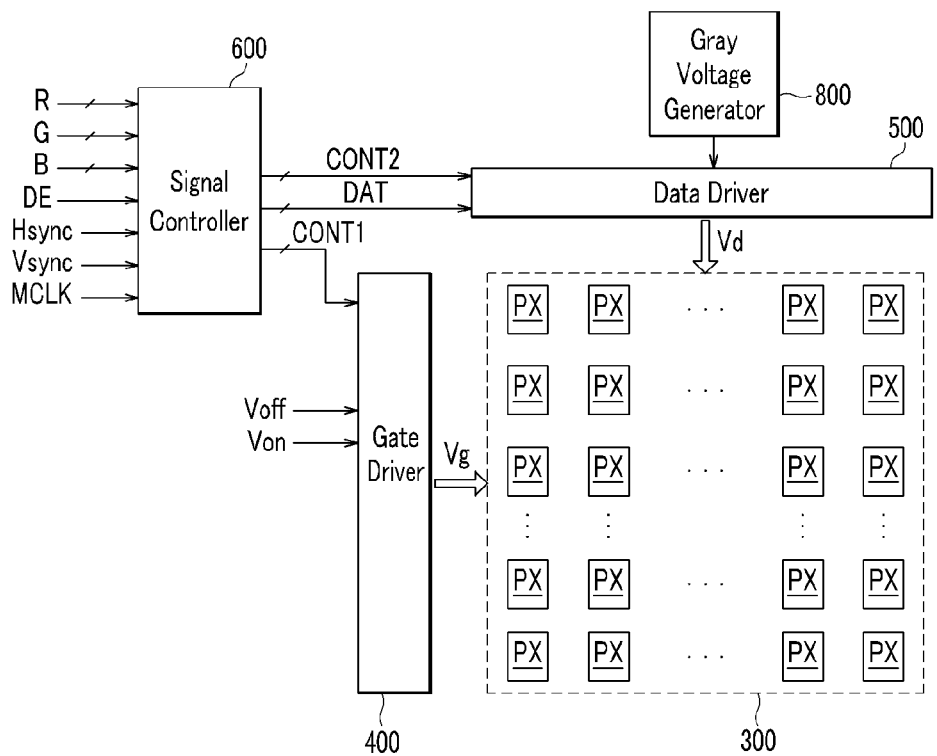
FIG. 1 is a block diagram of an exemplary embodiment of a liquid crystal display according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
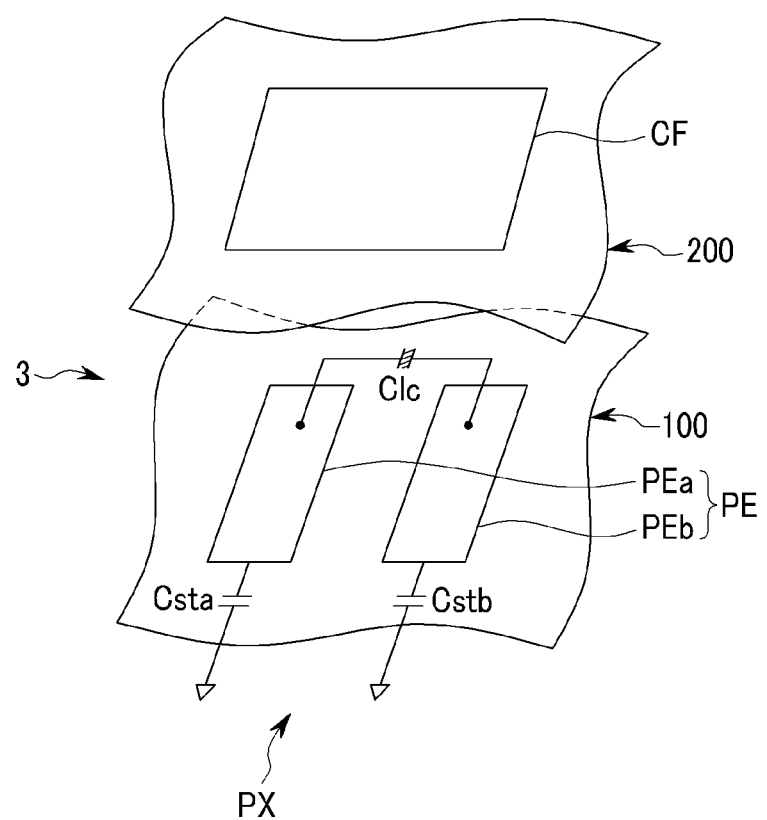
FIG. 2 is an equivalent circuit diagram of an exemplary embodiment of a pixel of a liquid crystal display according to the present invention.
Figure 3:
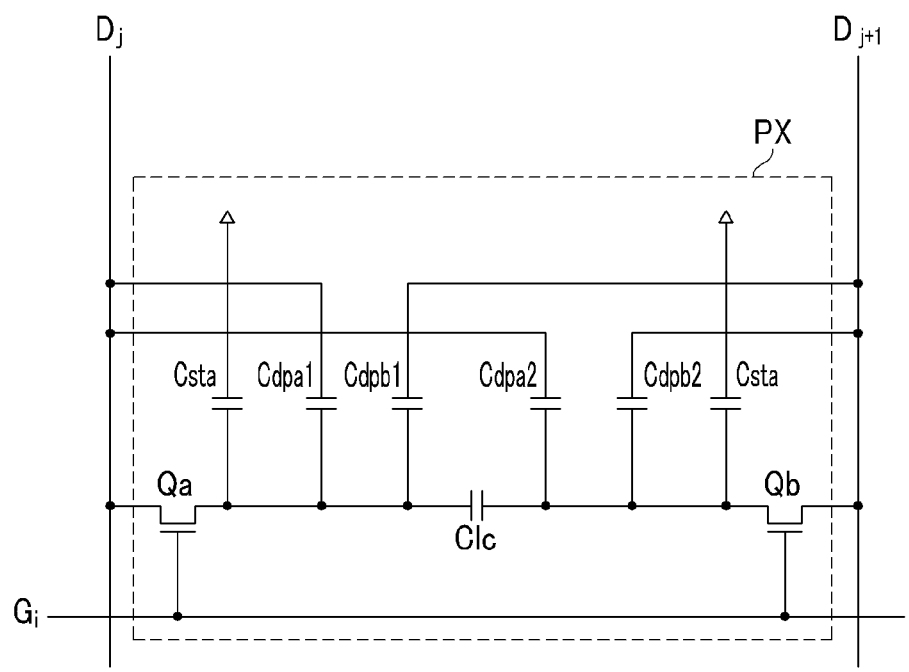
FIG. 3 is a schematic circuit diagram of an exemplary embodiment of a pixel of a liquid crystal display according to the present invention.

FIG. 1 is a block diagram of an exemplary embodiment of a liquid crystal display according to the present invention, FIG. 2 is a schematic equivalent circuit diagram illustrating an exemplary embodiment of one pixel of the liquid crystal display, and FIG. 3 is an schematic circuit diagram illustrating an exemplary embodiment of the one pixel of the liquid crystal display.

As shown in FIG. 1, an exemplary embodiment of a liquid crystal includes a liquid crystal panel assembly 300, a gate driver 400, a data driver 500, a gray voltage generator 800 and a signal controller 600.

As shown in FIG. 1 and the schematic equivalent circuit diagram of FIG. 3, the liquid crystal panel assembly 300 includes signal lines $G_i$, $D_j$, and $D_{j+1}$, and pixels PX that are connected thereto and arranged substantially in a matrix pattern. As shown in FIG. 2, the liquid crystal panel assembly 300 includes a lower panel 100 and an upper panel 200, and a liquid crystal layer 3 interposed between the lower panel 100 and the upper panel 200.

The signal lines $G_i$, $D_j$, and $D_{j+1}$ include gate lines $G_i$ that transmit gate signals (also referred to as "scanning signals"), and data lines $D_j$ and $D_{j+1}$ that transmit data signals. The gate lines $G_i$ extend substantially along a first direction, e.g., a transverse direction, and are disposed substantially parallel to each other, while the data lines $D_j$ and $D_{j+1}$, extend substantially along a second direction, e.g., a longitudinal direction substantially perpendicular to the first direction, and are disposed substantially parallel to each other.

Each of the pixels PX, for example, a pixel PX connected to the i-th (i=1, 2, ..., n) gate line $G_i$ and the j-th and (j+1)-th (j=1, 2, ..., m) data lines $D_j$ and $D_{j+1}$, includes a first switching element Qa and a second switching element Qb connected to the signal lines $G_i$, $D_j$, and $D_{j+1}$, and a liquid crystal capacitor Clc, a first storage capacitor Csta, and a second storage capacitor Qstb that are connected thereto, and also includes a first assistance capacitor Cdpa1 and a second assistance capacitor Cdpb1 connected to the data lines $D_j$ and $D_{j+1}$ and a first switching element Qa, and a third assistance capacitor Cdpa2 and a fourth assistance capacitor Cdpb2 connected to the data lines $D_j$ and $D_{j+1}$, and a second switching element Qb. In an alternative exemplary embodiment, the pixels PX may not include the first storage capacitor Csta and the second storage capacitor Cstb. A capacitance of the first assistance capacitor Cdpa1 may be substantially the same as a capacitance of the second assistance capacitor Cdpb1, and a capacitance of the third assistance capacitor Cdpa2 may be substantially the same as a capacitance of the fourth assistance capacitor Cdpb2.

The first and second switching elements Qa and Qb, respectively, may be three-terminal elements such as a thin film transistor ("TFT") provided on the lower panel 100, for example. The first and second switching elements Qa and Qb may include a control terminal connected to the gate line Gi, an input terminal connected to the data lines $D_j$ and $D_{j+1}$, and an output terminal connected to the liquid crystal capacitor Clc and the first and second storage capacitors Csta and Cstb.

As shown in FIG. 2 and FIG. 3, the liquid crystal capacitor Clc includes a first subpixel electrode PEa and a second subpixel electrode PEb of the lower panel 100 as two terminals thereof. The liquid crystal layer 3 interposed between the first and second subpixel electrodes PEa and PEb may be a dielectric. The first subpixel electrode PEa is connected to the first switching element Qa, and the second subpixel electrode PEb is connected to the second switching element Qb. The liquid crystal layer 3 includes dielectric anisotropy, and liquid crystal molecules of the liquid crystal layer 3 may be aligned such that their major axes are perpendicular to surfaces of the display panels when an electric field is not applied. In an exemplary embodiment, the liquid crystal layer 3 may include positive dielectric anisotropy.

The first subpixel electrode PEa and the second subpixel electrode PEb included in a subpixel electrode PE may be disposed in different layers or in a same layer. The first and second storage capacitors Csta and Cstb that assist the liquid crystal capacitor Clc may be disposed as an additional electrode line (not shown) on the lower panel 100, and the first and second subpixel electrodes PEa and PEb overlap with an insulator interposed therebetween.

To display a color image, the each of the pixels PX represents one of primary colors (e.g., spatial division) or the each of the pixels PX represents the primary colors in turn (e.g., temporal division), and a spatial or temporal sum of the primary colors is thereby recognized as a desired color. The primary colors include red, green, and blue colors, for example. FIG. 2 shows an exemplary embodiment of the spatial division in which the each of the pixels PX includes a color filter CF representing one of the primary colors in an area of the upper panel 200 disposed opposite to, e.g., facing, the first and second subpixel electrodes 191a and 191b. In an alternative exemplary embodiment, the color filter CF may be provided on or under the first and second subpixel electrodes 191a and 191b on the lower panel 100.

At least one polarizer (not shown) is provided in the liquid crystal panel assembly 300.

An exemplary embodiment of a driving method of a liquid crystal display will be described with reference to FIG. 4 and FIG. 5 as well as FIG. 2 and FIG. 3.

Figure 4:
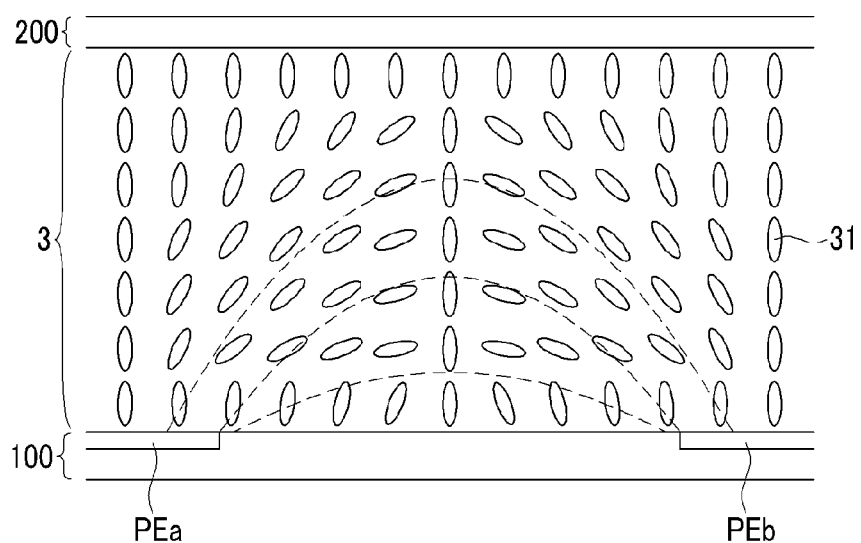
FIG. 4 is a partial cross-sectional view of an exemplary embodiment of a liquid crystal display according to the present invention.
Figure 5:
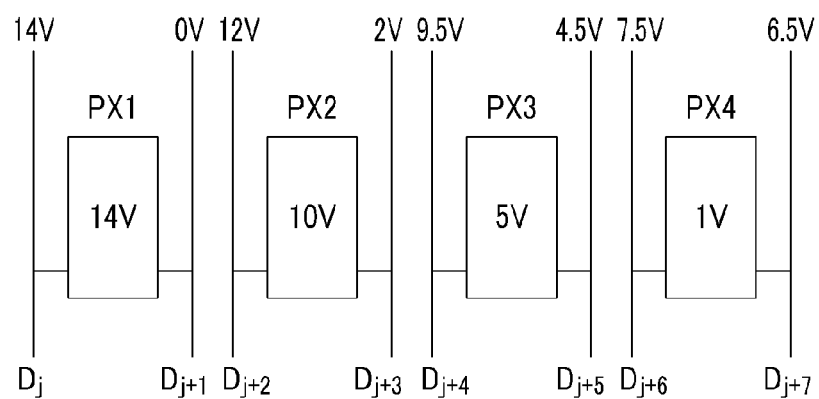
FIG. 5 is a plan view showing data lines and pixels of an exemplary embodiment of a liquid crystal display according to the present invention.

FIG. 4 is a partial cross-sectional view illustrating an exemplary embodiment of a liquid crystal display, and FIG. 5 is a plan view a voltages applied to data lines and pixels of an exemplary embodiment of the liquid crystal display.

As shown in FIG. 2 and FIG. 3, when data voltages including a first data voltage and a second data voltage are applied to the data lines $D_j$ and $D_{j+1}$, two data voltages are applied to the pixel PX by turning on the first switching element Qa and the second switching element Qb. That is, the first data voltage is applied to the first subpixel electrode PEa through the first data line $D_j$ and the first switching element Qa, and the second data voltage is applied to the second subpixel electrode PEb through the second data line $D_{j+1}$ and the second switching element Qb. The first and second data voltages applied to the first and second subpixel electrodes PEa and PEb are corresponding to a luminance of the pixel PX for displaying, and a polarity of the first data voltages relative to the reference voltage Vref is opposite to a polarity of the second voltage relative to the reference voltage Vref. In an exemplary embodiment, when a minimum voltage applicable to the liquid crystal display is zero (0) volts (V) and a maximum voltage is about 14V, the reference voltage Vref may be about 7V. When the reference voltage Vref is about 7V, a data voltage applied to the first data line $D_j$ may be from about 0V to about 7V and a data voltage applied to the second data line $D_{j+1}$ may be from about 7V to about 14V, or a data voltage applied to the first data line $D_j$ may be from about 7V to about 14V and a data voltage applied to the second data line $D_{j+1}$ may be from about 0V to about 7V.

A voltage difference between the two data voltages, which is the first data voltage applied to the first subpixel electrode PEa and the second data voltage applied to the second subpixel electrode PEb including polarities opposite to each other, may be a charged voltage of the liquid crystal capacitor Clc or a pixel voltage. When the voltage difference exists between the two terminals of the liquid crystal capacitor Clc, as shown in FIG. 4, an electric field parallel to the surfaces of the lower panel 100 and the upper panel 200 (hereinafter collectively referred to as "display panels 100 and 200") is generated in the liquid crystal layer 3 between the first subpixel electrode PEa and the second subpixel electrode PEb. When liquid crystal molecules 31 have positive dielectric anisotropy, the liquid crystal molecules 31 are aligned such that the long axes thereof are inclined to be parallel to a direction of the electric field, and an inclination degree of the liquid crystal molecules is different according to a magnitude of the pixel voltage. When the liquid crystal molecules 31 are aligned as described above, the liquid crystal layer 3 is referred to as an electrically-induced optical compensation ("EOC") mode. Thus, a change of degree of polarization of the light before and after passes through the liquid crystal layer 3 may vary according to the inclination degree of the liquid crystal molecules 31. The change of degree of polarization is substantially equivalent to a change of the transmittance of a polarizer, and thereby the pixels PX display images of desired luminance.

FIG. 5 shows an example of the voltages applied to the data lines when the charging voltages of the liquid crystal capacitors of four neighboring pixels are 14V, 10V, 5V and 1V, the minimum voltage that is applicable to the liquid crystal display is 0V, and the maximum voltage is 14V, in an exemplary embodiment of the liquid crystal display.

As shown in FIG. 5, the each of the pixels PX is connected to pairs of data lines $D_j$ and $D_{j+1}$, $D_{j+2}$ and $D_{j+3}$, $D_{j+4}$ and $D_{j+5}$, and $D_{j-6}$ and $D_{j+7}$. The two data voltages having opposite polarities with respect to the reference voltage Vref are applied to the pairs of data lines $D_j$ and $D_{j+1}$, $D_{j+2}$ and $D_{j+3}$, $D_{j+4}$ and $D_{j+5}$, and $D_{j+6}$ and $D_{j+7}$ connected to one pixel PX, and the difference between the two data voltages is a pixel voltage of the each of the pixels PX. In an exemplary embodiment, when the reference voltage Vref is about 7V, a target pixel voltage of a first pixel PX1 may be about 14V by applying about 14V to the first line $D_j$ and about 0V to the second data line $D_{j+1}$, a target pixel voltage of a second pixel PX2 may be about 10V by applying about 12 V to a third data line $D_{j+2}$ and about 2 V to and a fourth data line $D_{j+3}$, a target pixel voltage of a third pixel PX3 may be about 5V by applying about 9.5V to a fifth data lines $D_{j+4}$ and about 4.5V to a sixth data line $D_{j+5}$, and a target pixel voltage of a fourth pixel PX4 may be about 1V by applying about 7.5V to a seventh data line $D_{j+6}$ and about 6.5V to an eighth data line $D_{j+7}$.

In an exemplary embodiment, the two data voltages having opposite polarities with respect to the reference voltage Vref are applied to a pixel PX, and thereby the driving voltage of the liquid crystal display is substantially increased, the response speed of the liquid crystal molecules 31 is substantially improved, and the transmittance of the liquid crystal display is substantially increased. When the polarities of the two data voltages applied to the pixel PX are opposite, although the inversion of the data driver 500 is a column inversion or a row inversion, degradation of the display quality due to flicker is substantially prevented, as a dot inversion driving is used.

In an exemplary embodiment, when the first and second switching elements Qa and Qb are turned off in the pixel PX, each of voltages applied to the first and second subpixel electrodes PEa and PEb are dropped by a kickback voltage and thereby a charged voltage of the pixel PX is substantially maintained. Accordingly, display characteristics of the liquid crystal display are substantially improved.

In an exemplary embodiment, capacitances of the first assistance capacitor Cdpa1 and the second assistance capacitor Cdpb1 that are formed by the first subpixel electrode PEa that are connected to two data lines $D_j$ and $D_{j+1}$, that receive the two data voltages having opposite, and the first switching element Qa, may be substantially equal to each other, and capacitances of the third assistance capacitor dpa2 and the fourth assistance capacitor Cdpb2 that are formed by the second subpixel electrode PEb connected to the two data lines $D_j$ and $D_{j+1}$ and the second switching element Qb may be substantially equal to each other. Accordingly, the magnitude difference of the parasitic capacitances that are generated between the first subpixel electrode PEa and the second subpixel electrode PEb, and the two data lines $D_j$ and $D_{j+1}$ that the two data voltages having opposite polarities are applied to, is decreased such that the crosstalk deterioration due to the parasitic capacitance between the first subpixel electrode PEa and the second subpixel electrode PEb, and the two data lines $D_j$ and $D_{j+1}$, is effectively prevented.

An exemplary embodiment of the liquid crystal panel assembly will be further described with reference to FIG. 6 and FIG. 7 in detail.

Figure 6:
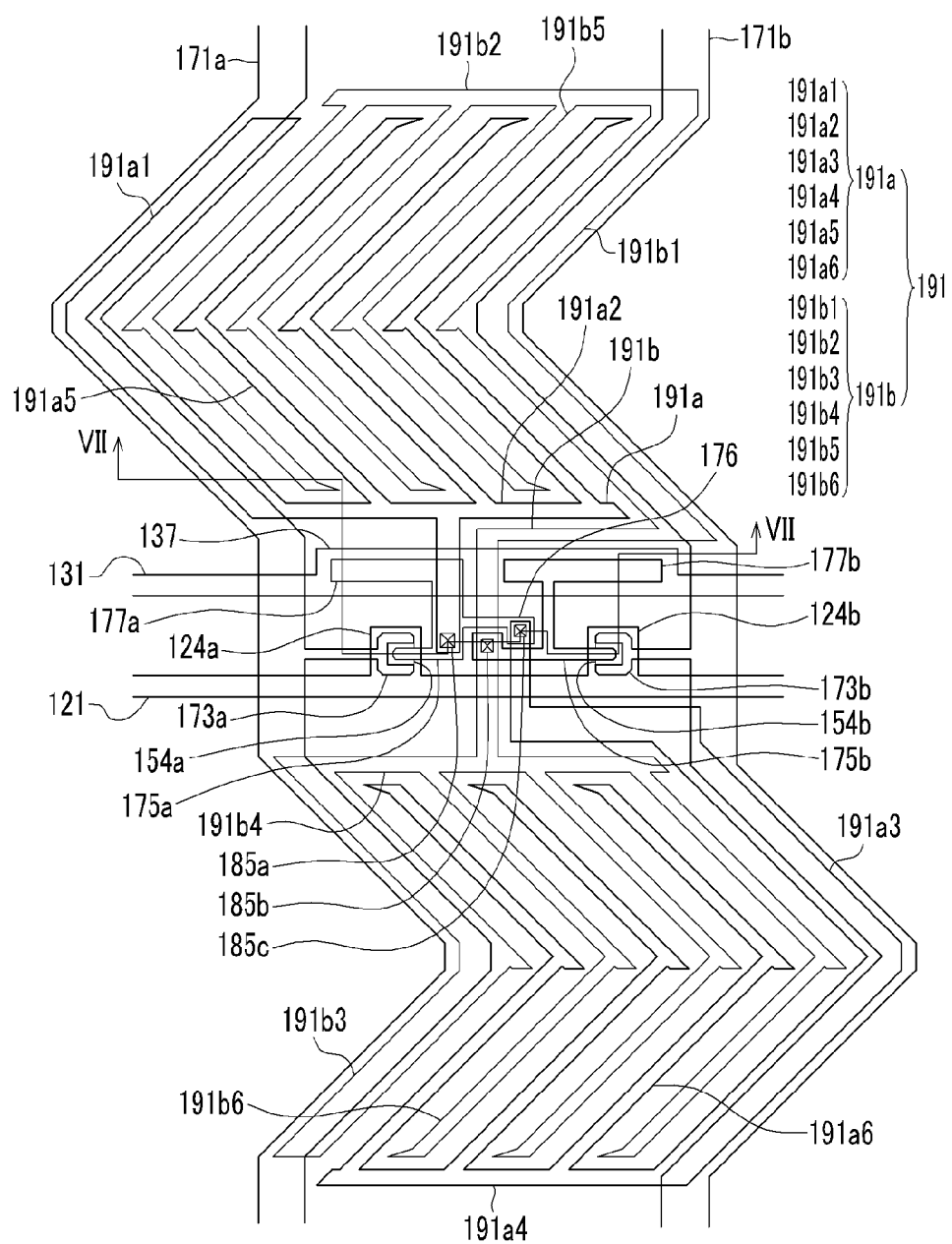
FIG. 6 is a plan view illustrating a layout of an exemplary embodiment of a liquid crystal panel assembly according to the present invention.
Figure 7:
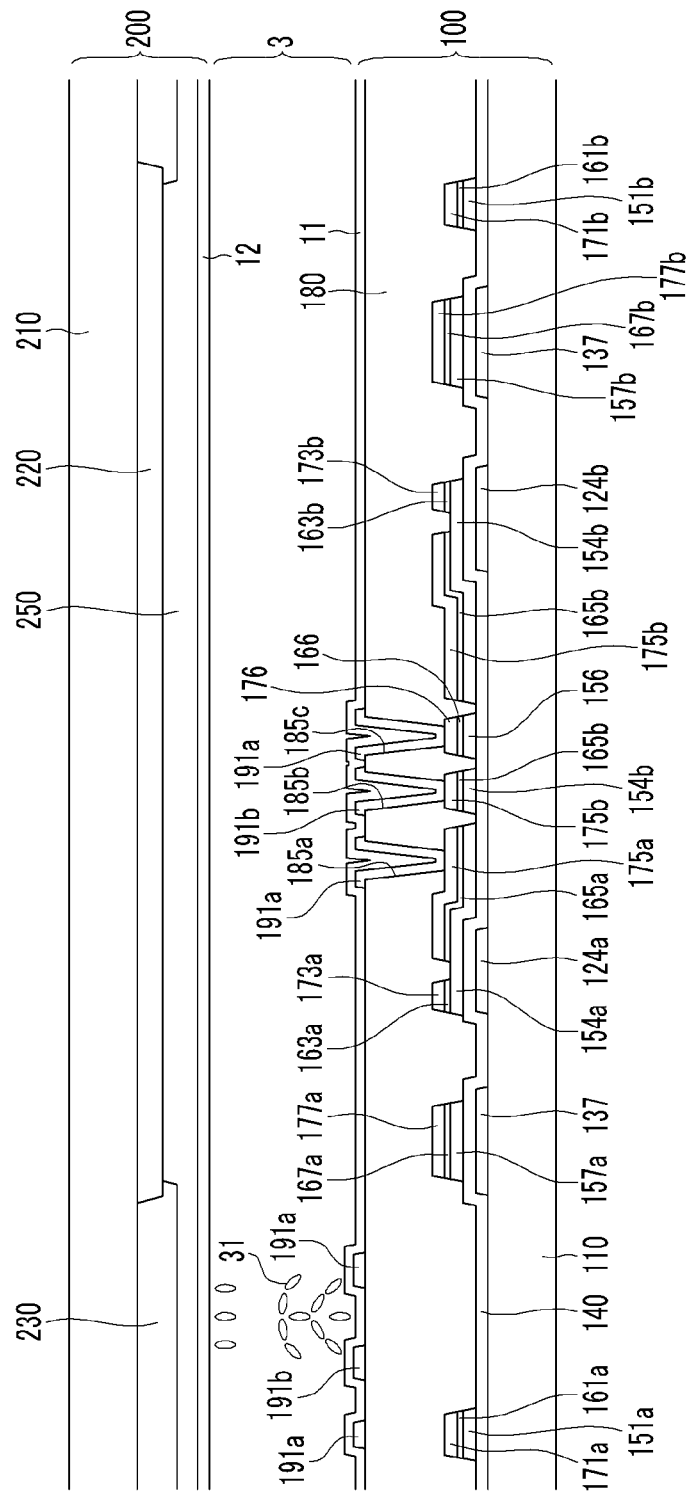
FIG. 7 is a partial cross-sectional view taken along line VII-VII of FIG. 6.

FIG. 6 is a plan view illustrating a layout of an exemplary embodiment of a liquid crystal panel assembly, and FIG. 7 is a partial cross-sectional view taken along line VII-VII of FIG. 6.

As shown in FIG. 6 and FIG. 7, the liquid crystal display according to an exemplary embodiment of the present invention includes display panels, for example, a lower panel 100 and an upper panel 200 disposed opposite to, e.g., facing, the lower panel 100, and a liquid crystal layer 3 interposed between the display panels 100 and 200.

The lower panel 100 will be described hereafter.

In the lower panel 100, a gate conductor including a gate line 121 and a storage electrode line 131 is disposed on a first substrate 110, e.g., an insulating substrate 110.

The gate line 121 transmits gate signal and extends in a substantially transverse direction, and the gate line 121 includes a first gate electrode 124a and a second gate electrode 124b protruding substantially upward.

The storage electrode line 131 extends in a substantially transverse direction, and a predetermined voltage, for example, a common voltage Vcom, is applied to the storage electrode line 131, and the storage electrode line 131 includes a protrusion forming a storage electrode 137.

The gate line 121 and the storage electrode line 131 are disposed on the central part of the pixel.

The gate conductor may include a single-layered or multi-layered structure.

In an exemplar embodiment, a gate insulating layer 140, which may be made of silicon nitride (SiNx) or silicon oxide (SiOx), is disposed on the gate conductor.

In an exemplary embodiment, semiconductor layers, for example, a first semiconductor stripes 151a and a second semiconductor stripe 151b, which may be made of hydrogenated amorphous silicon ("a-Si") or polysilicon ("p-Si"), are disposed on the gate insulating layer 140.

The first semiconductor stripe 151a and the second semiconductor stripe 151b mainly extend in a longitudinal direction and are periodically curved. The first semiconductor stripe 151a includes a first protrusion 154a extending toward the first gate electrode 124a, and the second semiconductor stripe 151b includes a second protrusion 154b extending toward the second gate electrode 124b. The first semiconductor stripe 151a includes first expansions 156 extended from the first protrusion 154a. The first semiconductor stripe 151a and the second semiconductor stripe 151b further include second expansions 157a and third expansions 157b extended from the first protrusion 154a and the second protrusion 154b and disposed on the storage electrode 137. (hereinafter collectively referred to as "semiconductor stripes 151a, 151b, 154a, 154b, 156, 157a, and 157b")

First ohmic contacts including stripes and islands 161a, 163a, 165a, 166, and 167a are disposed on the first semiconductor stripe 151a, 154a, 156 and 157a, and second ohmic contacts including stripes and islands 161b, 163b, 165b, 167b are disposed on the second semiconductor stripes 151b, 154b, and 157b. The first and second ohmic contacts (hereinafter collectively referred to as "ohmic contacts 161a, 161b, 163a, 163b, 165a, 165b, 166, 167a, and 167b") may be made of silicide or a material such as n+ hydrogenated amorphous silicon, e.g., in which an n-type impurity such as phosphorus, e.g., is doped with a high concentration.

Data conductors including a pair of data lines, e.g., a first data line 171a and a second data line 171b, a pair of drain electrodes, e.g., a first drain electrode 175a and a second drain electrode 175b, and a pair of storage conductors, e.g., a first storage conductor 177a and a second storage conductor 177b are disposed on the ohmic contacts 161a, 161b, 163a, 163b, 165a, 165b, 166, 167a, and 167b, and the gate insulating layer 140.

The first data line 171a and the second data line 171b transmit data signals, and extend sin a substantially longitudinal direction, and the first data line 171a and the second data line 171b thereby intersect the gate line 121 and the storage electrode line 131. The first data line 171a and the second data line 171b include curved portions and longitudinal portions, and thereby the first data line 171a and the second data line 171b are substantially periodically curved. The curved portions include a pair of oblique portions that are connected to each other in a chevron-like shape, and the pair of oblique portions which may form an angle of about 45 degrees with the gate line 121. The longitudinal portions cross the gate line 121 and include a first source electrode 173a and a second source electrode 173b extending toward the first gate electrode 124a and the second gate electrode 124b. In an alternative exemplary embodiment, the curved portions may be curved more than twice.

The first storage conductor 177a and the second storage conductor 177b may be extended from the first drain electrode 175a and the second drain electrode 175b, and thereby overlapping portions of the storage electrode 137. The first drain electrode 175a may include an expansion 176 extended therefrom.

In an exemplary embodiment of a manufacturing method of the lower panel 100, the data conductors 171a, 171b, 175a, 175b, 176, 177a, and 177b, the semiconductor stripes 151a, 151b, 154a, 154b, 156, 157a, and 157b, and the ohmic contacts 161a, 161b, 163a, 163b, 165a, 165b, 166, 167a, and 167b may be formed using a single photolithography process.

A photosensitive film used in the photolithography process may have various thicknesses based on positions thereof, and particularly the photosensitive film may include a first portion and a second portion at which the thicknesses may be substantially reduced. The first portion may be in a wiring region of the first data line 171a, the second data line 171b, the first drain electrode 175a, the second drain electrode 175b, the first storage conductor 177a, the second storage conductor 177b and the expansion 176, and the second portion may be in channel regions of thin film transistors.

Methods of forming of the photosensitive film in various thicknesses based on the location of the photosensitive film may vary. In an exemplary embodiment of the methods includes forming a photomask with a translucent area, a light transmitting area and a light blocking area. The translucent area may include a slit pattern, a lattice pattern, or a thin film having medium transmittance or medium thickness. In an exemplary embodiment, when the slit pattern is used, a slit width or a space between slits may be substantially less than a resolution of exposure equipment used in the photolithography process. In an alternative exemplary embodiment, the method includes using a reflowable photosensitive film. The method may form a thin portion by making a photosensitive film flow into a region where the photosensitive film is not present after forming the reflowable photosensitive film with a general exposure mask having a light transmitting area and a light blocking area.

The manufacturing method is substantially simplified by reducing time for the photolithography process.

The first gate electrode 124a, the first source electrode 173a, and the first drain electrode 175a form the first thin film transistor ("TFT") along with the first protrusion 154a of the first semiconductor stripe, and the second gate electrode 124b, the second source electrode 173b, and the second drain electrode 175b form the second thin film transistor along with the second protrusion 154b. A channel of the first thin film transistor may be formed in the first protrusion 154a between the first source electrode 173a and the first drain electrode 175a, and A channel of the second thin film transistor Qb may be formed in the second protrusion 154b of the second semiconductor stripe between the second source electrode 173b and the second drain electrode 175b.

The data conductors 171a, 171b, 175a, 175b, 176, 177a, and 177b may include a single-layered or multi-layered structure.

The ohmic contacts 161a, 161b, 163a, 163b, 165a, 165b, 166, 167a, and 167b are interposed between the first semiconductor stripe and the second semiconductor stripe 151a, 151b, 154a, 154b, 156, 157a, and 157b, and the data conductor 171a, 171b, 175a, 175b, 176, 177a, and 177b, and reduce contact resistances therebetween. The first and second protrusions 154a and 154b include a portion exposed without being covered by the first and second data lines 171a and 171b and the first and second drain electrodes 175a and 175b, and a portion between the first and second source electrodes 173a and 173b and the first and second drain electrodes 175a and 175b.

A passivation layer 180 may be made of an inorganic insulator or an organic insulator and may be disposed on the first and second data lines 171a and 171b, the first and second drain electrodes 175a and 175b, and the first and second protrusions 154a and 154b.

The passivation layer 180 includes a first contact hole 185a, a second contact hole 185b, and a third contact hole 185c. The first contact hole 185a, the second contact hole 185b, and the third contact hole 185c respectively exposes the first drain electrodes 175a, the second drain electrodes 175b, and the expansions 176 of the first drain electrodes 175a.

A pixel electrode 191, which may be made of a transparent conductive material, e.g., indium tin oxide ("ITO") or indium zinc oxide ("IZO"), or a reflective metal, e.g., aluminum, silver, chromium, or alloys thereof, and include first subpixel electrodes 191a and second subpixel electrodes 191b, are disposed on the passivation layer 180.

As shown in FIG. 6, one of the pixel electrodes 191 includes curved edges substantially parallel to curved portions of the first and second data lines 171a and 171b, and transverse edges and longitudinal edges substantially parallel to the gate lines 121 and the first and second data lines 171a and 171b, and includes a chevron-like shape. Each of the pixels includes an upper portion, disposed above the gate line 121 and the storage electrode line 131, and a lower portion, disposed below the gate line 121 and the storage electrode line 131. In an exemplary embodiment, the upper portion and the lower portion of the pixel electrode are rotationally symmetric with respect to a middle point of an imaginary transverse central line between the upper portion and the lower portion.

As shown in FIG. 6, the first subpixel electrode 191a includes a first upper portion and a first lower portion. More specifically, the first subpixel electrode 191a includes a first upper longitudinal stem 191a1 including a curved edge substantially parallel to the curved portions of the first data line 171a and overlapping the first data line 171a disposed on the upper portion of the pixel 191, a first upper transverse stem 191a2 connected to the first upper longitudinal stem 191a1, a first lower longitudinal stem 191a3 including a curved edge substantially parallel to the curved portions of the second data line 171b and overlapping the second data line 171b disposed on the lower portion of the pixel, a first lower transverse stem 191a4 connected to the first lower longitudinal stem 191a3, first upper branches 191a5 extending from the first upper transverse stem 191a2 and substantially parallel to the first upper longitudinal stem 191a1, and first lower branches 191a6 extending from the first lower transverse stem 191a4 and substantially parallel to the first lower longitudinal stem 191a3. The first upper branches 191a5 and the first lower branches 191a6 may form an angle of about 45 degrees with the gate line 121.

In an exemplary embodiment, an overlapping area of the first data line 171a and the first upper longitudinal stem 191a1 of the first subpixel electrode 191a may be substantially equal to an overlapping area of the second data line 171b and the first lower longitudinal stem 191a3 of the first subpixel electrode 191a.

As shown in FIG. 6, the second subpixel electrode 191b includes a second upper portion and a second lower portion, and more particularly, includes a second upper longitudinal stem 191b1 including a curved edge substantially parallel to the curved portions of the second data line 171b and overlapping the second data line 171b disposed on the upper portion of the pixel, a second upper transverse stem 191b2 connected to the second upper longitudinal stem 191b1, a second lower longitudinal stem 191b3 including a curved edge substantially parallel to the curved portions of the first data line 171a and overlapping the first data line 171a disposed on the lower portion of the pixel, a second lower transverse stem 191b4 connected to the second lower longitudinal stem 191b3, second upper branches 191b5 extending from the second upper transverse stem 191b2 and substantially parallel to the second upper longitudinal stem 191b1, and second lower branches 191b6 extending from the second lower transverse stem 191b4 and substantially parallel to the second lower longitudinal stem 191b3.

In an exemplary embodiment, an overlapping area of the second data line 171b and the second upper longitudinal stem 191b1 of the second subpixel electrode 191b may be substantially equal to an overlapping area of the first data line 171a and the second lower longitudinal stem 191b3 of the second subpixel electrode 191b.

The first upper branches and the first lower branches of the first subpixel electrodes 191a and the second upper branches and the second lower branches of the second subpixel electrodes 191b are alternately disposed by engaging the upper and lower branches of the first subpixel electrodes 191a with the upper and lower branches of the second subpixel electrodes 191b respectively with a predetermined gap therebetween, and thereby formed in a pectinated pattern.

The first upper transverse stem 191a2 of the first subpixel electrode 191a is connected to the first drain electrode 175a through the first contact hole 185a, and the lower first longitudinal stem 191a3 of the first subpixel electrode 191a is connected to the expansion 176 of the first drain electrode 175a through the third contact hole 185c and thereby connected to the first drain electrode 175a to receive a data voltage from the first drain electrode 175a.

The second upper longitudinal stem 191b1 of the second subpixel electrode 191b and the lower transverse stem 191b4 are connected to each other, and are connected to the second drain electrode 175b through the second contact hole 185b to receive a data voltages from the second drain electrode 175b.

The expansion 176 of the first drain electrode 175a is extended to a circumference of the second drain electrode 175b, and the first contact hole 185a and the third contact hole 185c exposing the first drain electrode 175a and the expansion 176 of the first drain electrode 175a are disposed on side portions of the second contact hole 185b exposing the second drain electrode 175b.

In an exemplary embodiment, an overlapping area of the first subpixel electrode 191a, and the first drain electrode 175a and the expansion 176 thereof, may be substantially equal to an overlapping area of the second subpixel electrode 191b and the second drain electrode 175b.

When the first data line 171a and the second data line 171b receive the two data voltages having opposite polarities and the overlapping area of the first data line 171a and the first upper longitudinal stem 191a1 of the first subpixel electrode 191a and the overlapping area of the second data line 171b and the first lower longitudinal stem 191a3 of the first subpixel electrode 191a are substantially equal to each other, the magnitudes of parasitic capacitances thereof may be substantially equal to each other. Accordingly, it is effectively prevented a crosstalk deterioration generated due to a deviation of the parasitic capacitance between the first subpixel electrode 191a and the first and second data lines 171a and 171b that receive voltages having opposite polarities. In an exemplary embodiment, the first subpixel electrode 191a overlaps two data lines 171a and 171b and the aperture ratio of the liquid crystal display is thereby substantially increased.

In an exemplary embodiment, when the first data line 171a and the second data line 171b receive the two voltages having the different polarities and the overlapping area of the first data line 171a and the second upper longitudinal stem 191b1 of the second subpixel electrode 191b and the overlapping area of the second data line 171b and the second lower longitudinal stem 191b3 of the second subpixel electrode 191b are substantially equal to each other, the magnitudes of the parasitic capacitances thereof may be substantially equal to each other. Accordingly, it is effectively prevented that a crosstalk deterioration generated due to a deviation of the parasitic capacitance between the second subpixel electrode 191b and the first and second data lines 171a and 171b that receive the two data voltages having opposite polarities. In addition, the second subpixel electrode 191b overlaps the first and second data lines 171a and 171b, and the aperture ratio of the liquid crystal display is thereby substantially increased.

The first subpixel electrode 191a and the second subpixel electrode 191b form the liquid crystal capacitor Clc along with the liquid crystal layer 3 therebetween, and thereby the applied voltage may be maintained after the first thin film transistor Qa and the second thin film transistor Qb are turned off.

The first storage conductor 177a and the second storage conductor 177b of the first drain electrode 175a and the second drain electrode 175b connected to the first subpixel electrode 191a and the second subpixel electrode 191b overlap the storage electrode 137 with the gate insulating layer 140 and the semiconductor layers 157a, 157b, 167a, and 167b interposed therebetween and thereby forms the first storage capacitor Csta and the second storage capacitor Cstb, and the first storage capacitor Csta and the second storage capacitor Cstb substantially increase a capacity of a voltage maintenance of the liquid crystal capacitor Clc.

In an exemplary embodiment, an overlapping area of the storage electrode 137 and the first storage conductor 177a forming the first storage capacitor Csta is substantially equal to an overlapping area of the storage electrode 137 and the second storage conductor 177b forming the second storage capacitor Cstb.

The storage electrode 137 overlaps the first and second storage conductor 177a and 177b leaving a space for the gate insulating layer 140 and the semiconductor layers 157a, 157b, 167a, and 167b interposed therebetween, and thereby forms the first storage capacitor Csta and the second storage capacitor Cstb. In an exemplary embodiment the first storage capacitor Csta and the second storage capacitor Cstb are formed by using the gate conductor and the data conductors without an additional process for forming the first storage capacitor Csta and the second storage capacitor Cstb, and the manufacturing process of the liquid crystal display is thereby substantially simplified. The gate insulating layer 140 and the semiconductor layers 157a, 157b, 167a, and 167b are disposed between two terminals of the first storage capacitor Csta and the second storage capacitor Cstb, and the capacitances of the first storage capacitor Csta and the second storage capacitor Cstb are thereby substantially increased compared to the case that the passivation layer 180 is disposed between two terminals of the first storage capacitor Csta and the second storage capacitor Cstb.

In an exemplary embodiment, an overlapping area of the storage electrode 137 and the first storage conductor 177a forming the first storage capacitor Csta is substantially equal to an overlapping area of the storage electrode 137 and the second storage conductor 177b forming the second storage capacitor Cstb, and thereby a capacitance of the first storage capacitor Csta may be similar to a capacitance of the second storage capacitor Cstb. Accordingly, when the first storage capacitor Csta and the second storage capacitor Cstb are formed by overlapping the storage electrode 137 and the first and second storage conductors 177a and 177b that the voltages having the different polarities in every frame are applied leaving a space for the semiconductor layers 157a, 157b, 167a, and 167b, an inversion capacitance of the first storage capacitor Csta and an inversion capacitance of the second storage capacitor Cstb may be substantially symmetrical to each other per frame and a voltage of the liquid crystal capacitor Clc is thereby uniformly maintained.

A lower alignment layer 11 is coated on an inner surface of the lower panel 100, and the lower alignment layer 11 may be a vertical alignment layer.

The upper panel 200 will be described hereafter.

In an exemplary embodiment, a light blocking member 220 may be disposed on an insulation substrate 210 made of transparent glass or plastic. The light blocking member 220 prevents light leakage between the pixel electrodes 191, and defines an opening facing the pixel electrode 191.

A color filter 230 may be disposed on the insulation substrate 210 and the light blocking member 220. The color filter 230 is mainly disposed in the regions enclosed by the light blocking member 220, and may be extended according to the column of the pixel electrodes 191. Each of color filters 230 may represent one of the primary colors, such as three primary colors of red, green, and blue, for example.

An overcoat 250 is disposed on the color filter 230 and the light blocking member 220. The overcoat 250 may be made of an insulator including an organic insulator, and the overcoat 250 prevents the color filter 230 from being exposed and provides a planarized surface. In an alternative exemplary embodiment, the upper panel does not include the overcoat 250.

An upper alignment layer 12 is coated on an inner surface of the upper panel 200, and the upper alignment layer 12 may be a vertical alignment layer.

A polarizer (not shown) may be provided on outer surfaces of the display panels 100 and 200.

The liquid crystal layer 3 interposed between the lower panel 100 and the upper panel 200 includes liquid crystals with positive dielectric anisotropy. Longitudinal axes of the liquid crystal molecules 31 may be aligned substantially vertically with respect to the surfaces of the display panels 100 and 200 when no electric field is applied therebetween.

When the two data voltages having opposite polarities are applied to the first and second subpixel electrodes 191a and 191b, an electric field is generated parallel to the surface of the display panels 100 and 200. Thus, the liquid crystal molecules of the liquid crystal layer 3 that are initially aligned substantially perpendicular to the surfaces of the display panels 100 and 200 are rearranged in response to the electric field, and the long axes of liquid crystal molecules are thereby declined parallel to at direction of the electric field, and the change degree of the polarization of a light incident to the liquid crystal layer 3 varies based on the declination degree of the liquid crystal molecules. The change of the polarization may lead to a change of the transmittance by the polarizer, thereby the liquid crystal display displays the images.

As described above, when the liquid crystal molecules 31 that are aligned vertically are used, the contrast ratio of the liquid crystal display may be substantially increased and the wide viewing angle is realized. When the two data voltages having opposite polarities with reference to the reference voltage Vref are applied to the pixel PX, the driving voltage is substantially increased and the response speed of the liquid crystal display becomes faster. As described above, the influence of a kickback voltage is effectively prevented, and a flicker deterioration is thereby effectively prevented.

As described above, when the liquid crystal molecules 31 that are aligned perpendicular to the display panels 100 and 200 are used, the contrast ratio of the liquid crystal display is substantially increased and the wide viewing angle is realized. Also, the liquid crystal molecules 31 having the positive dielectric anisotropy have a larger dielectric anisotropy and less rotational viscosity than the liquid crystal molecules having the negative dielectric anisotropy, and the fast response speed is thereby obtained.

An exemplary embodiment of a liquid crystal panel assembly will be described with reference to FIG. 8 and FIG. 9.

Figure 8:
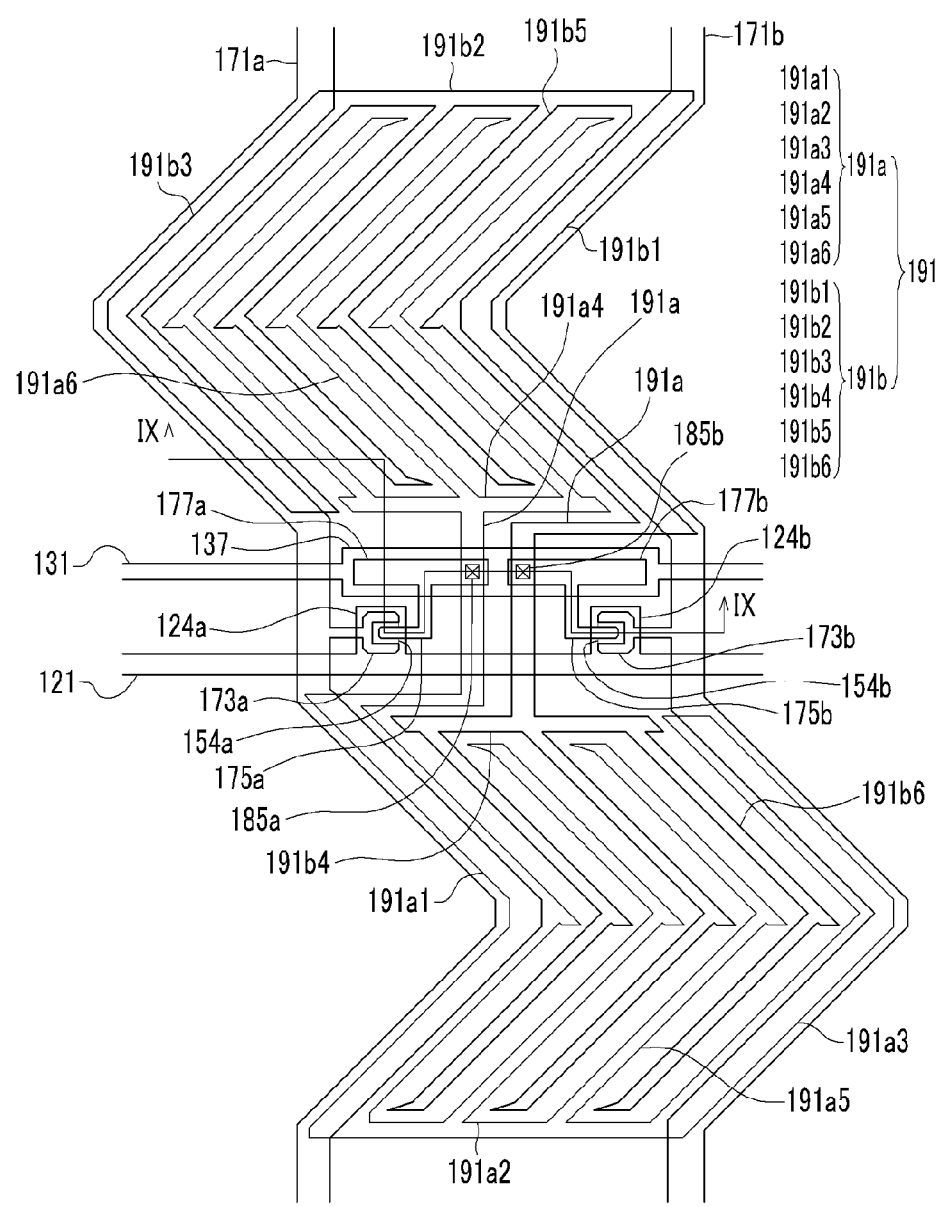
FIG. 8 is a plan view illustrating a layout of an alternative exemplary embodiment of a liquid crystal panel assembly according to the present invention.
Figure 9:
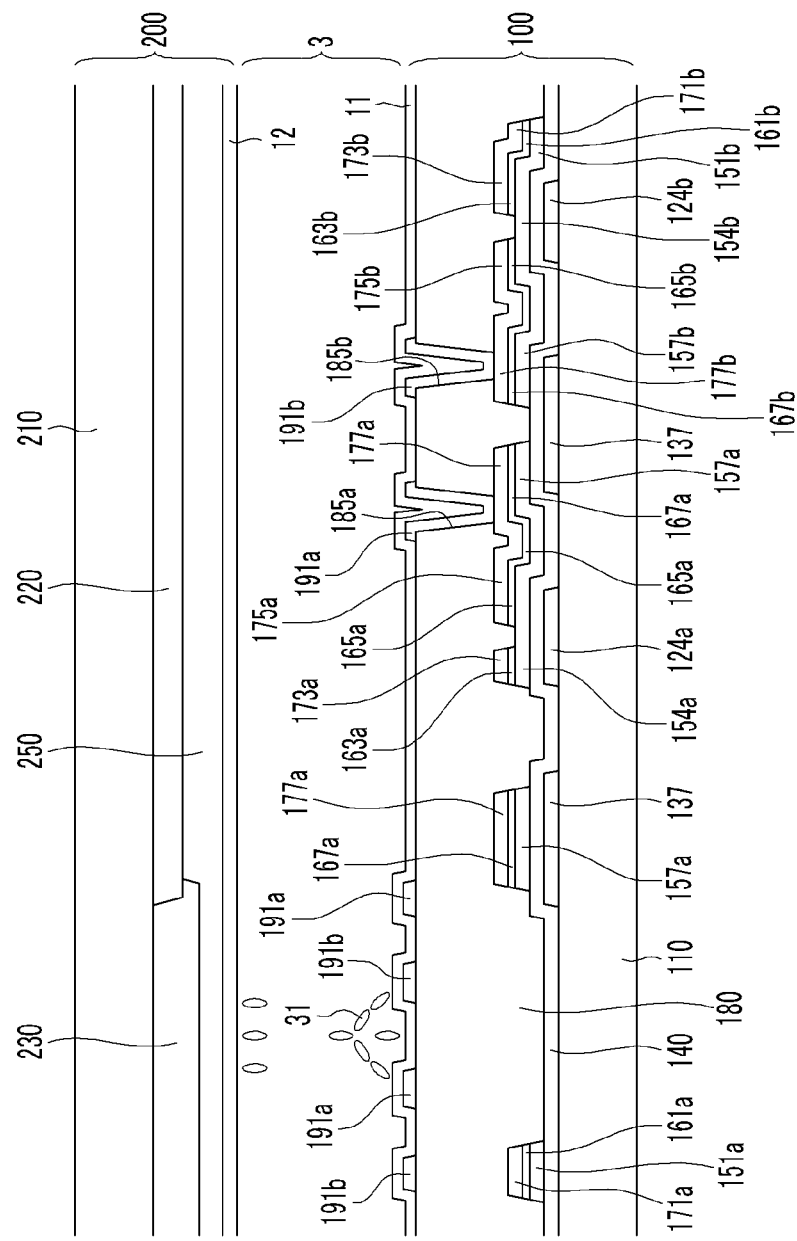
FIG. 9 is a partial cross-sectional view taken along line IX-IX of FIG. 8.

FIG. 8 is a plan view illustrating a layout of a liquid crystal panel assembly according to an alternative exemplary embodiment of the present invention, and FIG. 9 is a partial cross-sectional view taken along line IX-IX of FIG. 8.

A liquid crystal display according to an exemplary embodiment of the present invention includes a lower panel 100 and an upper panel 200 facing each other, and a liquid crystal layer 3 interposed between the upper and lower panels 200 and 100, respectively.

A layered structure of the liquid crystal panel assembly according to the present exemplary embodiment is substantially similar to the layered structure of the liquid crystal panel assembly in FIG. 6 and FIG. 7.

As shown in FIG. 8 and FIG. 9, the lower panel 100, a gate line 121 and storage electrode line 131 are disposed on the substrate 110. The gate line 121 includes the first gate electrode 124a and the second gate electrode 124b, the storage electrode line 131 includes the storage electrode 137, and the gate line 121 and the storage electrode line 131 are disposed on the central portion of the pixel.

A gate insulating layer 140, first and second semiconductor stripes 151a and 151b, respectively, including protrusions 154a and 154b and expansions 157a and 157b, and ohmic contacts, for example, ohmic contact stripes 161a and 161b including protrusions 163a and 163b and ohmic contact islands 165a, 165b, 167a, and 167b, are disposed on the gate line 121 and the storage electrode line 131.

First data line 171a and second data line 171b including source electrodes, e.g., the first source electrode 173a and the second source electrode 173b, drain electrodes, e.g., first drain electrode 175a and second drain electrode 175b, and storage conductors, e.g., a first storage conductor 177a and a second storage conductor 177b, are disposed on the ohmic contacts 161a, 161b, 165a, 165b, 167a, and 167b, and a passivation layer 180 is disposed thereon.

The first data line 171a and the second data line 171b include curved portions and longitudinal portions that are alternately connected to each other, and are periodically curved. The curved portions include a pair of oblique portions that are connected to each other in a chevron-like shape, and the oblique portions form an angle of about 45 degrees with the gate lines 121.

The passivation layer 180 includes a first contact hole 185a and a second contact hole 185b. A pixel electrode 191 including subpixel electrodes, e.g., a first subpixel electrode 191a and a second subpixel electrode 191b, are disposed on the passivation layer 180.

As shown in FIG. 8 and FIG. 9, a shape of the pixel electrode 191 and the connection relationship thereof with the drain electrodes 175a and 175b are different from a shape of the pixel electrode 191 and the connection relationship thereof with the drain electrodes 175a and 175 shown in the lower panel 100 of FIG. 6 and FIG. 7.

As shown in FIG. 8, a overall outer shape of one pixel electrode 191 has a pair of curved edges substantially parallel to the curved portions of the data lines 171a and 171b, and transverse edges and longitudinal edges substantially parallel to the gate lines 121 and the data lines 171a and 171b, and includes a chevron-like shape. Each of the pixels includes an upper portion disposed upward with respect to the gate line 121 and the storage electrode line 131 and a lower portion disposed downward with respect to the gate line 121 and the storage electrode line 131, and the upper portion and the lower portion of the pixel electrode respectively form a 2-fold rotational symmetry with respect to a middle point of an imaginary transverse central line, and are respectively divided into two regions.

The first subpixel electrode 191a includes a first upper portion and a first lower portion. More specifically, the first subpixel electrode 191a includes a first lower longitudinal stem 191a1 and a second lower longitudinal stem 191a3 including a curved edge substantially parallel to the curved portions of the first and second data lines 171a and 171b and overlapping the first and second data lines 171a and 171b disposed on the lower portion of the pixel, a first lower transverse stem 191a2 connecting the first and second lower longitudinal stems 191a1 and 191a3, a first upper transverse stem 191a4 disposed on the upper portion of the pixel, first lower branches 191a5 extending from the lower transverse stem 191a2 and substantially parallel to the first and second lower longitudinal stems 191a1 and 191a3, and first upper branches 191a6 extending from the first upper transverse stem 191a4 and substantially parallel to the first data line 171a and the second data line 171b.

In an exemplary embodiment, an overlapping area of the first data line 171a and the first lower longitudinal stem 191a1 of the first subpixel electrode 191a is substantially equal to an overlapping area of the second data line 171b and the second lower longitudinal stem 191a3 of the first subpixel electrode 191a.

The second subpixel electrode 191b includes a second upper portion and a second lower portion. More specifically, the second subpixel electrode 191b includes a first upper longitudinal stem 191b1 including a curved edge substantially parallel to the curved portions of the second data line 171b and overlapping the second data line 171b disposed on the upper portion of the pixel, a second upper longitudinal stem 191b3 including a curved edge substantially parallel to the curved portions of the first data line 171a and overlapping the first data line 171a disposed on the upper portion of the pixel, a second upper transverse stem 191b2 connecting the first and second upper longitudinal stems 191b1 and 191b3, a second lower transverse stem 191b4 disposed on the lower portion of the pixel, second upper branches 191b5 extending from the second upper transverse stem 191b2 and substantially parallel to the first and second upper longitudinal stems 191b1 and 191b3, and second lower branches 191b6 extending from the second lower transverse stem 191b4 and substantially parallel to the first data line 171a and the second data line 171b.

In an exemplary embodiment, an overlapping area of the second data line 171b and the first upper longitudinal stem 191b1 of the second subpixel electrode 191b is substantially equal to an overlapping area of the first data line 171a and the second upper longitudinal stem 191b3 of the second subpixel electrode 191b.

The first upper branches and the first lower branches of the first subpixel electrodes 191a and the second upper branches and the second lower branches of the second subpixel electrodes 191b are alternately disposed by engaging the upper and lower branches of the first subpixel electrodes 191a with the upper and lower branches of the second subpixel electrodes 191b respectively with a predetermined gap therebetween, and thereby formed in a pectinated pattern.

The first upper transverse stem 191a4 of the first subpixel electrode 191a, the first lower first longitudinal stem 191a1 and the first drain electrode 175a are connected through the first contact hole 185a, and thereby receive the first data voltage from the first drain electrode 175a. The first upper longitudinal stem 191b1 of the second subpixel electrode 191b, the lower transverse stem 191b4 and the second drain electrode 175b are connected through the second contact hole 185b, and thereby receive the second data voltage from the second drain electrode 175b.

In the liquid crystal display according to an exemplary embodiment, the first contact hole 185a and the second contact hole 185b are disposed on the first storage conductor 177a and the second storage conductor 177b that are made of the opaque metal, and a reduction of the aperture ratio based on a formation of the first and second contact holes 185a and 185b is thereby substantially reduced.

In the liquid crystal display according to an exemplary embodiment, when the first data line 171a and the second data line 171b receive the two data voltages having opposite polarities and the overlapping areas of the first data line 171a and the first lower longitudinal stem 191a1 of the first subpixel electrode 191a is substantially equal to the overlapping area of the second data line 171b and the second lower longitudinal stem 191a3 of the first subpixel electrode 191a, the magnitude of the parasitic capacitance of the first data line 171a and the first lower longitudinal stem 191a1 is thereby substantially equal to the magnitudes of the parasitic capacitances of the second data line 171b and the second lower longitudinal stem 191a3. Accordingly, a crosstalk deterioration generated due to a deviation of the parasitic capacitance between the first subpixel electrode 191a and the first and second data lines 171a and 171b that receive the two data voltages having opposite polarities is effectively prevented. Also, the first subpixel electrode 191a overlaps two data lines 171a and 171b such that the aperture ratio of the liquid crystal display is substantially increased.

In an exemplary embodiment, when the first data line 171a and the second data line 171b receive the two data voltages having opposite polarities and the overlapping areas of the first data line 171a and the first upper longitudinal stem 191b1 of the second subpixel electrode 191b may be substantially equal to an overlapping area of the second data line 171b and the second upper longitudinal stem 191b3 of the second subpixel electrode 191b, and thereby a parasitic capacitance between the first data line 171a and the first upper longitudinal stem 191b1 may be substantially equal to the parasitic capacitance between the second data line 171b and the second upper longitudinal stem 191b3. Accordingly, a crosstalk deterioration generated due to the deviation of the parasitic capacitance between the second subpixel electrode 191b and the first and second data lines 171a and 171b to which the two data voltages having opposite polarities are applied is effectively prevent. In an exemplary embodiment, the second subpixel electrode 191b overlaps the first and second data lines 171a and 171b, and the aperture ratio of the liquid crystal display is thereby substantially increased.

In an exemplary embodiment, the storage electrode 137 overlaps the first storage conductor 177a and the second storage conductor 177b via the gate insulating layer 140 and semiconductor layers 157a, 157b, 167a, and 167b, and thereby forms the first storage capacitor Csta and the second storage capacitor Cstb. In an exemplary embodiment, an overlapping area of the storage electrode 137 and the first storage conductor 177a forming the first storage capacitor Csta may be substantially equal to an overlapping area of the storage electrode 137 and the second storage conductor 177b forming the second storage capacitor Cstb.

In an exemplary embodiment, the first storage capacitor Csta and the second storage capacitor Cstb are formed by using the gate conductor and the data conductors without an additional process for forming the first storage capacitor Csta and the second storage capacitor Cstb, and the manufacturing process of the liquid crystal display is thereby substantially simplified. The gate insulating layer 140 and the semiconductor layers 157a, 157b, 167a, and 167b are disposed between two terminals of the first storage capacitor Csta and the second storage capacitor Cstb, and the capacitances of the first storage capacitor Csta and the second storage capacitor Cstb are substantially increased compared to the case that the passivation layer 180 is disposed between the two terminals of the first storage capacitor Csta and the second storage capacitor Cstb.

In an exemplary embodiment, an overlapping area of the storage electrode 137 and the first storage conductor 177a forming the first storage capacitor Csta may be substantially equal to an overlapping area of the storage electrode 137 and the second storage conductor 177b forming the second storage capacitor Cstb, and the capacitances of the first storage capacitor Csta and the second storage capacitor Cstb may be thereby similar to each other. Accordingly, although the first storage capacitor Csta and the second storage capacitor Cstb are formed by overlapping the first and second storage conductors 177a and 177b to which the two data voltages having opposite polarities are applied and the storage electrode 137 via the semiconductor layers 157a, 157b, 167a, and 167b, the capacitances of the first storage capacitor Csta and the second storage capacitor Cstb may be symmetrical to each other per frame of the inversion such that the liquid crystal capacitor Clc may substantially uniformly maintain the voltage of the liquid crystal capacitor Clc.

An exemplary embodiment of a liquid crystal display will be described with reference to FIG. 10 and FIG. 9.

Figure 10:
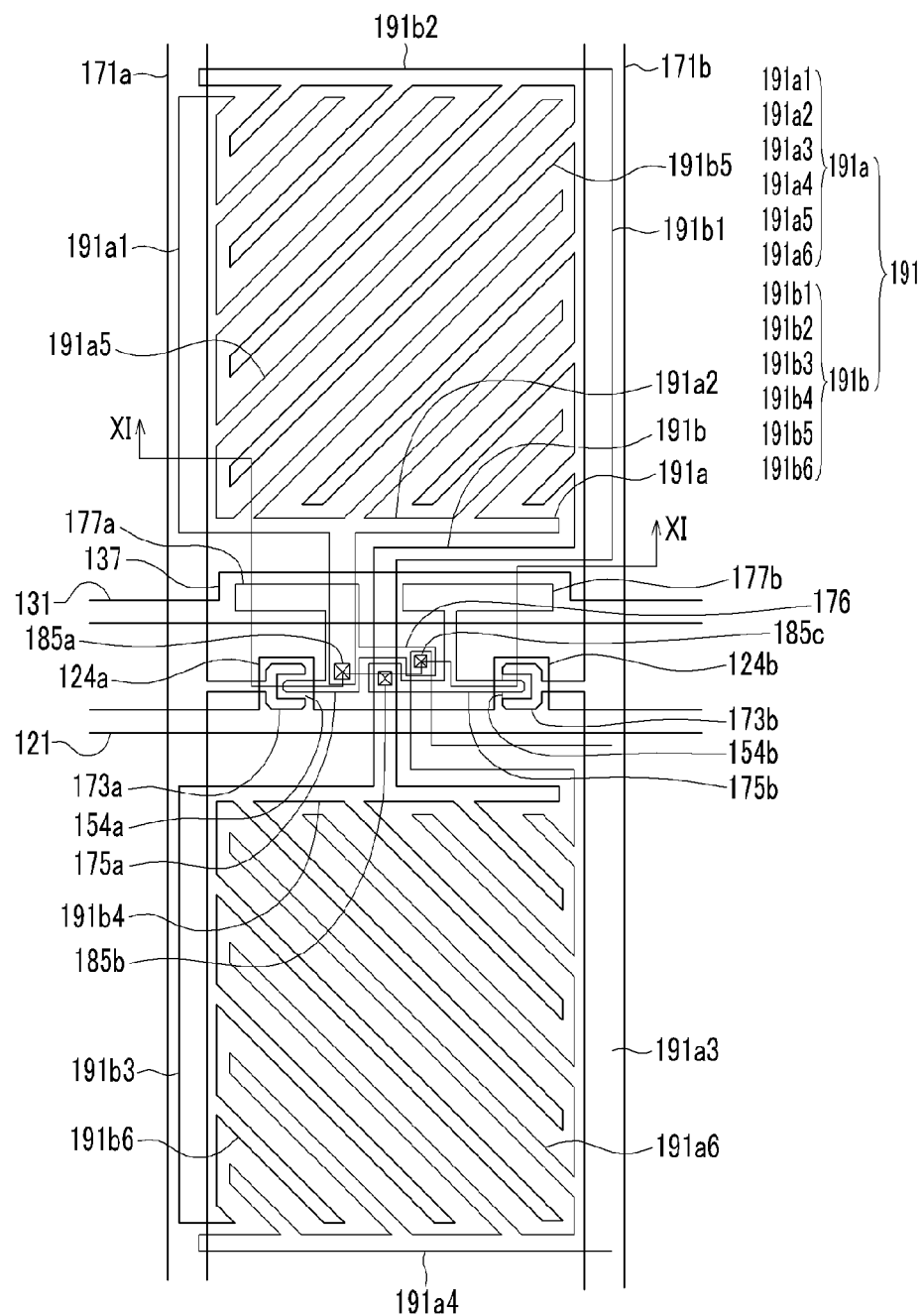
FIG. 10 is a plan view illustrating a layout of another alternative exemplary embodiment of a liquid crystal panel assembly according to the present invention.
Figure 11:
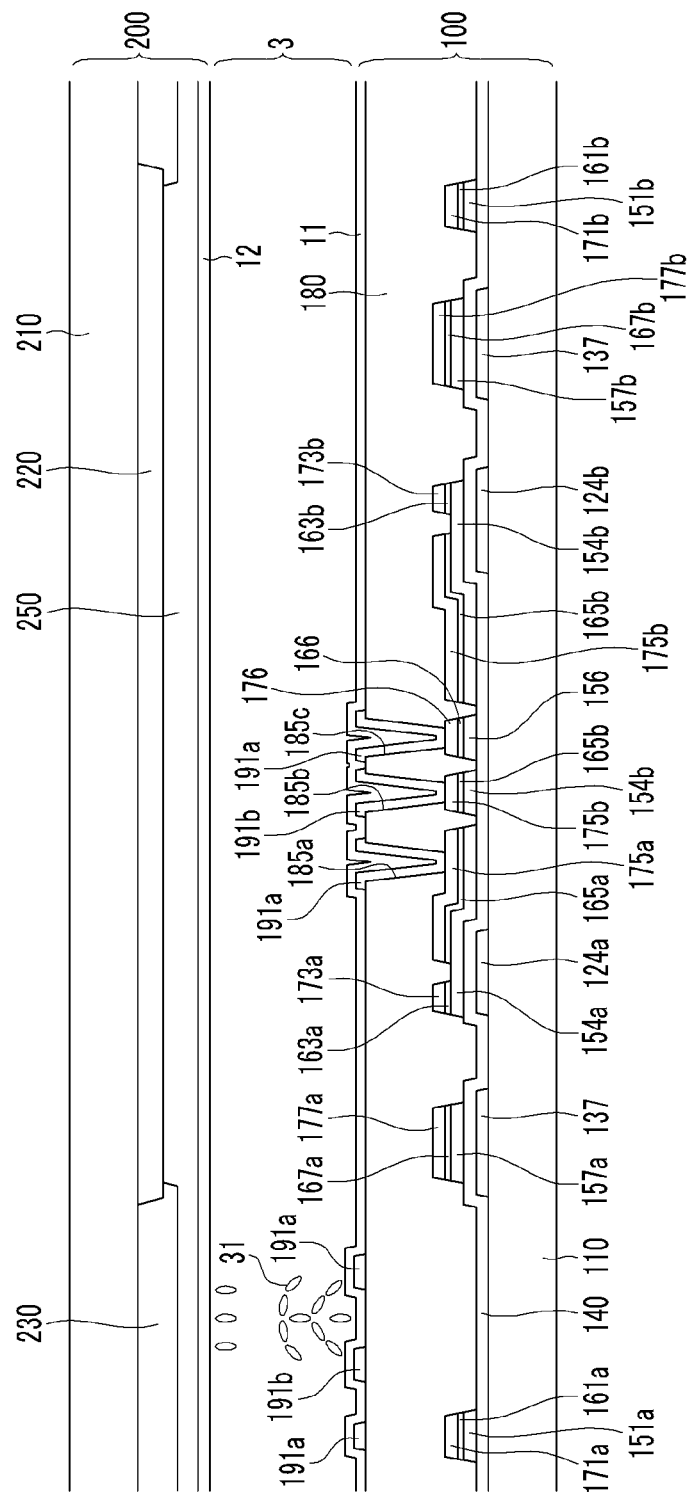
FIG. 11 is a partial cross-sectional view taken along line XI-XI of FIG. 10.

FIG. 10 is a plan view illustrating a layout of a liquid crystal panel assembly according to another alternative exemplary embodiment of the present invention, and FIG. 11 is a partial cross-sectional view taken along line XI-XI of FIG. 10.

An exemplary embodiment of a liquid crystal display includes display panels, for example, a lower panel 100 and an upper panel 200 facing each other, and a liquid crystal layer 3 interposed between the display panels 100 and 200.

A layered structure of the liquid crystal panel assembly according to the present exemplary embodiment is substantially similar to the layered structure of the liquid crystal panel assembly in FIG. 6 and FIG. 7.

Referring again to the lower panel 100, gate lines 121 and storage electrode lines 131 are disposed on the substrate 110. The gate line 121 includes the first gate electrode 124a and the second gate electrode 124b, the storage electrode line 131 includes the storage electrode 137, and the gate line 121 and the storage electrode line 131 are disposed on the central portion of the pixel.

A gate insulating layer 140, semiconductor layers, e.g., first and second semiconductor stripes 151a and 151, respectively, including protrusions 154a and 154b and expansions 156, 157a, and 157b, and ohmic contacts, e.g., ohmic contact stripes 161a and 161b, respectively, including protrusions 163a and 163b and ohmic contact islands 165a, 165b, 166, 167a, and 167b are disposed on the gate line 121 and the storage electrode line 131.

First data line 171a and second data line 171b including the first source electrode 173a and the second source electrode 173b, first drain electrode 175a and second drain electrode 175b including an expansion 176, and a first storage conductor 177a and a second storage conductor 177b are disposed on the ohmic contacts 161a, 161b, 165a, 166, 165b, 167a, and 167b, and a passivation layer 180 is formed thereon.

The passivation layer 180 has the first contact hole 185a, the second contact hole 185b, and the third contact hole 185c exposing the first drain electrode 175a, the second drain electrode 175b, and the expansion 176 of the first drain electrode 175a. A pixel electrode 191 including a first subpixel electrode 191a and a second subpixel electrode 191b is disposed on the passivation layer 180.

In an exemplar embodiment, the data lines 171a and 171b may not include the curved portions, an overall outer shape of the pixel electrode 191 is a quadrangle, and the first subpixel electrode 191a and the second subpixel electrode 191b form a 2-fold rotational symmetry with respect to a middle point of the gate line 121 and the storage electrode line 131.

The first subpixel electrode 191a includes a first upper portion and a first lower portion. More specifically, the first subpixel electrode 191a includes an first upper longitudinal stem 191a1 overlapping the first data line 171a disposed on the upper portion of the pixel, a first upper transverse stem 191a2 connected to the first upper longitudinal stem 191a1, a first lower longitudinal stem 191a3 overlapping the second data line 171b disposed on the lower portion of the pixel, a first lower transverse stem 191a4 connected to the first lower longitudinal stem 191a3, first upper branches 191a5 extending substantially obliquely from the first upper transverse stem 191a2 in a right upward direction, and first lower branches 191a6 extending substantially obliquely from the first lower transverse stem 191a4 in a right downward direction. The first upper and lower branches 191a5 and 191a6, respectively, may form an angle of about 45 degrees with the gate line 121.

In an exemplary embodiment, an overlapping area of the first data line 171a and the first upper longitudinal stem 191a1 of the first subpixel electrode 191a may be substantially equal to an overlapping area of the second data line 171b and the first lower longitudinal stem 191a3 of the first subpixel electrode 191a.

The second subpixel electrode 191b includes a second upper portion and a second lower portion. More specifically, the second subpixel electrode 191b includes a second upper longitudinal stem 191b1 overlapping the second data line 171b disposed on the upper portion of the pixel, a second upper transverse stem 191b2 connected to the second upper longitudinal stem 191b1, a second lower longitudinal stem 191b3 overlapping the first data line 171a disposed on the lower portion of the pixel, a second lower transverse stem 191b4 connected to the second lower longitudinal stem 191b3, second upper branches 191b5 extending substantially obliquely from the second upper transverse stem 191b2 in a left downward direction, and second lower branches 191b6 extending substantially obliquely from the second lower transverse stem 191b4 in a left upward direction. The second upper and lower branches 191b5 and 191b6, respectively, may form an angle of about 45 degrees with the gate line 121.

In an exemplary embodiment, an overlapping area of the second data line 171b and the second upper longitudinal stem 191b1 of the second subpixel electrode 191b may be substantially equal to an overlapping area of the first data line 171a and the second lower longitudinal stem 191b3 of the second subpixel electrode 191b.

The first upper branches and the first lower branches of the first subpixel electrodes 191a and the second upper branches and the second lower branches of the second subpixel electrodes 191b are alternately disposed by engaging the upper and lower branches of the first subpixel electrodes 191a with the upper and lower branches of the second subpixel electrodes 191b respectively with a predetermined gap therebetween, and thereby formed in a pectinated pattern.

The first upper transverse stem 191a2 of the first subpixel electrode 191a is connected to the first drain electrode 175a through the first contact hole 185a, and the first lower longitudinal stem 191a3 of the first subpixel electrode 191a is connected to the expansion 176 through the third contact hole 185c exposing the expansion 176 of the first drain electrode 175a, and the first upper traverse stem 191a2 and the first lower longitudinal stem 191a4 are thereby connected to the first drain electrode 175a, and receive the first data voltage from the first drain electrode 175a.

In an exemplary embodiment of the liquid crystal display, when the first data line 171a and the second data line 171b receive the two data voltages having opposite polarities and the overlapping areas of the first data line 171a and the first upper longitudinal stem 191a1 of the first subpixel electrode 191a and the overlapping area of the second data line 171b and the first lower longitudinal stem 191a3 of the first subpixel electrode 191a are substantially equal to each other, the magnitudes of the parasitic capacitances thereof may be substantially equal to each other. Accordingly, it may be prevented the crosstalk deterioration generated due to the deviation of the parasitic capacitance between the first subpixel electrode 191a and two data lines 171a and 171b that receive the two data voltages having opposite polarities. Also, the first subpixel electrode 191a overlaps the two data lines 171a and 171b, and the aperture ratio of the liquid crystal display is thereby substantially increased.

In an exemplary embodiment, when the first data line 171a and the second data line 171b receive the two data voltages having opposite polarities, and the overlapping area of the first data line 171a and the second upper longitudinal stem 191b1 of the second subpixel electrode 191b are applied, and the overlapping area of the second data line 171b and the second lower longitudinal stem 191b3 of the second subpixel electrode 191b are substantially equal to each other, the magnitudes of the parasitic capacitances thereof may be substantially equal to each other. Accordingly, it may be prevented the crosstalk deterioration generated due to the deviation of the parasitic capacitance between the second subpixel electrode 191b and the two data lines 171a and 171b that receive the two data voltages having opposite polarities. Also, the second subpixel electrode 191b overlaps the two data lines 171a and 171b, and the aperture ratio of the liquid crystal display is thereby substantially increased.

In an exemplar embodiment, the storage electrode 137 overlaps the first storage conductor 177a and the second storage conductor 177b via the gate insulating layer 140 and the semiconductor layers 157a, 157b, 167a, and 167b, and thereby forms the first storage capacitor Csta and the second storage capacitor Cstb. In an exemplary embodiment, the overlapping area of the storage electrode 137 and the first storage conductor 177a forming the first storage capacitor Csta is substantially equal to the overlapping area of the storage electrode 137 and the second storage conductor 177b forming the second storage capacitor Cstb.

Accordingly, the first storage capacitor Csta and the second storage capacitor Cstb are formed by using the gate conductor and the data conductors without an additional process for forming the first storage capacitor Csta and the second storage capacitor Cstb, and the manufacturing process of the liquid crystal display is thereby substantially simplified. When the gate insulating layer 140 and the semiconductor layers 157a, 157b, 167a, and 167b are disposed between two terminals of the first storage capacitor Csta and the second storage capacitor Cstb, the capacitance of the first storage capacitor Csta and the second storage capacitor Cstb is substantially increased compared to the case that the passivation layer 180 is disposed between the two terminals the first storage capacitor Csta and the second storage capacitor Cstb.

In an exemplary embodiment, when the overlapping area of the storage electrode 137 and the first storage conductor 177a forming the first storage capacitor Csta may be substantially equal to the overlapping area of the storage electrode 137 and the second storage conductor 177b forming the second storage capacitor Cstb, the capacitances of the first storage capacitor Csta and the second storage capacitor Cstb may be substantially similar to each other. Accordingly, although the first storage capacitor Csta and the second storage capacitor Cstb are formed by overlapping the first storage conductor 177a and the second storage conductor 177b that receive the two data voltages having opposite polarities in every frame, and the storage electrode 137 via the semiconductor layer 157a, 157b, 167a, and 167b, the capacitances of the first storage capacitor Csta and the second storage capacitor Cstb may be substantially symmetrical to each other per frame of the inversion such that the liquid crystal capacitor Clc may substantially uniformly maintain the voltage.

Figure 12:
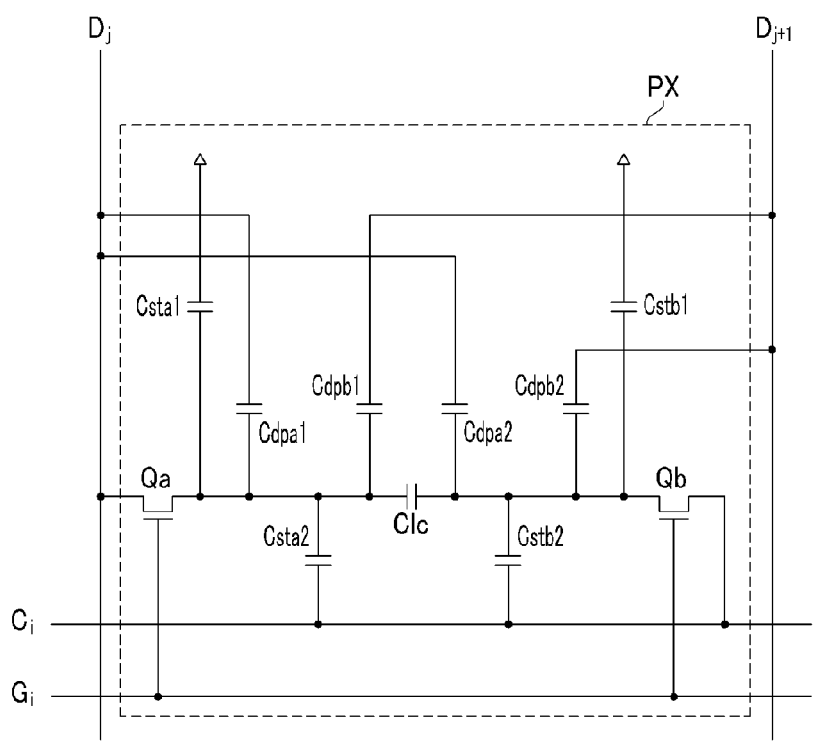
FIG. 12 is a schematic equivalent circuit diagram of an alternative exemplary embodiment of a pixel of a liquid crystal display according to the present invention.

An alternative exemplary embodiment of a liquid crystal display will be described with reference to FIG. 12 as well as FIG. 2. FIG. 12 is a schematic circuit diagram of a pixel of a liquid crystal display according to another alternative exemplary embodiment of the present invention.

As shown in FIG. 12, the liquid crystal includes signal lines $G_i$, Vcom, $D_j$, and $D_{j-1}$, and pixels PX connected thereto.

The signal lines $G_i$, Vcom, $D_j$, and $D_{j+1}$ include gate lines $G_i$ that transmit gate signals (also referred to as "scanning signals"), common voltage lines $C_i$ that transmit a common voltage Vcom, and data lines $D_j$ and $D_{j+1}$ that transmit data signals. The common voltage lines $C_i$ may be connected to each other. The data voltage applied to the data line Dj and the common voltage Vcom applied to the common voltage lines Ci are inverted with respect to the reference voltage Vref, and phases thereof may be opposite.

Each of the pixels PX includes the first switching element Qa connected to the gate line $G_i$ and the data line $D_j$, the second switching element Qb connected to the gate line Gi and the common voltage lines $C_i$, and the liquid crystal capacitor Clc, a first storage capacitor Csta1, a second storage capacitor Csta2, a third storage capacitor Cstb1, and a fourth storage capacitor Cstb2 that are connected to the first switching element Qa and the second switching element Qb. The second storage capacitor Csta2 and the fourth storage capacitor Cstb2 are connected to the first switching element Qa and the second switching element Qb, and the common voltage lines $C_i$. Also, the each of pixels PX includes a first assistance capacitor Cdpa1 and a second assistance capacitor Cdpb1 that are connected to two data lines $D_j$ and $D_{j+1}$, and the first switching element Qa, and a third assistance capacitor Cdpa2 and a fourth assistance capacitor Cdpb2 that are connected to the two data lines $D_j$ and $D_{j+1}$ and the second switching element Qb. Capacitances of the first assistance capacitor Cdpa1 and the third assistance capacitor Cdpa2 may be substantially equal to each other, and capacitances of the second assistance capacitor Cdpb1 and the fourth assistance capacitor Cdpb2 may be substantially equal to each other.

The first and second switching elements Qa and Qb are three-terminal elements such as thin film transistors, for example, provided on the lower panel 100. The first switching element Qa includes a control terminal connected to the gate line $G_i$, an input terminal connected to the data line $D_j$, and an output terminal connected to the liquid crystal capacitor Clc, the first storage capacitor Csta1, and the second storage capacitor Csta2, and the second switching element Qb includes a control terminal connected to the gate line $G_i$, an input terminal connected to the common voltage lines $C_i$, and an output terminal connected to the liquid crystal capacitor Clc, the third storage capacitor Cstb1, and the fourth storage capacitor Cstb2.

Referring again to FIG. 2 and FIG. 12, the liquid crystal capacitor Clc includes the first subpixel electrode PEa and the second subpixel electrode PEb of the lower panel 100 as two terminals. The liquid crystal layer 3 between the first and second subpixel electrodes PEa and PEb may be a dielectric. The first subpixel electrode PEa is connected to the first switching element Qa, and the second subpixel electrode PEb is connected to the second switching element Qb. The liquid crystal layer 3 has dielectric anisotropy, and liquid crystal molecules of the liquid crystal layer 3 may be aligned such that their major axes are perpendicular to the surfaces of the display panels when an electric field is not applied. The liquid crystal layer 3 may include positive dielectric anisotropy.

When the data line Dj is applied with the data voltage and the common voltage line Ci is applied with the common voltage Vcom, the first subpixel electrode PEa receives the data voltage applied to the first data line Dj through the first switching element Qa, and the second subpixel electrode PEb receives the common voltage Vcom applied to the common voltage line Ci through the second switching element Qb. The first and second data voltages applied to the first and second subpixel electrodes PEa and PEb are voltages corresponding to a luminance for the pixel PX to be displayed, and a polarity of the first data voltage with respect to a reference voltage is opposite to a polarity of the second data voltage with respect to the reference voltage Vref. The data voltage applied to the data line Dj and the common voltage Vcom applied to the common voltage line Ci may be inverted with respect to the reference voltage Vref, and the phases thereof may be opposite. In an exemplary embodiment, when a minimum voltage applicable to the liquid crystal display is 0V and a maximum voltage is 14V, the reference voltage Vref may be 7V, the data voltage applied to the first data line $D_j$ may be 0V to 7V, and the common voltage Vcom applied to the common voltage line $C_i$ may be 7V to 14V, and the data voltage applied to the first data line $D_j$ may be 7V to 14V, and the common voltage Vcom applied to the common voltage line $C_i$ may be 0V to 7V.

The difference between the first and second data voltages having the opposite polarities applied to the first and second subpixel electrodes PEa and PEb may be a charged voltage of the liquid crystal capacitor Clc, or a pixel voltage.

In an exemplary embodiment of the liquid crystal display, the first subpixel electrode PEa receives the data voltage applied to the first data line $D_j$ through the first switching element Qa, and the second subpixel electrode PEb receives the common voltage Vcom applied to the common voltage line $C_i$ through the second switching element Qb.

In an exemplary embodiment, one pixel includes two subpixel electrodes PEa and PEb, the two data voltages having opposite polarities are applied to different switching elements, and the one pixel may be connected to a gate line and two different data lines to charge the voltages of the predetermined magnitude to the liquid crystal capacitor Clc. In an exemplary embodiment, the first and second switching elements connected to the first and second subpixel electrodes may be connected to a same gate line, and the first and second switching elements may be connected to the two different data lines, to receive the two data voltages through the two different data lines.

In an exemplary embodiment, the one pixel may be connected to two gate lines of a pair, one data line, and one common voltage line, and the number of the data lines and the cost of the driver of the liquid crystal display are thereby substantially reduced. In an exemplary embodiment of the liquid crystal display, although the common voltage line may be added, the common voltage lines are connected to each other to received the common voltage of the same magnitude such that only a simple driver for applying the common voltage is added, and the driving method is thereby substantially simplified and the manufacturing cost is substantially low.

An exemplary embodiment of the liquid crystal display will be described with reference to FIG. 13 and FIG. 14.

Figure 13:
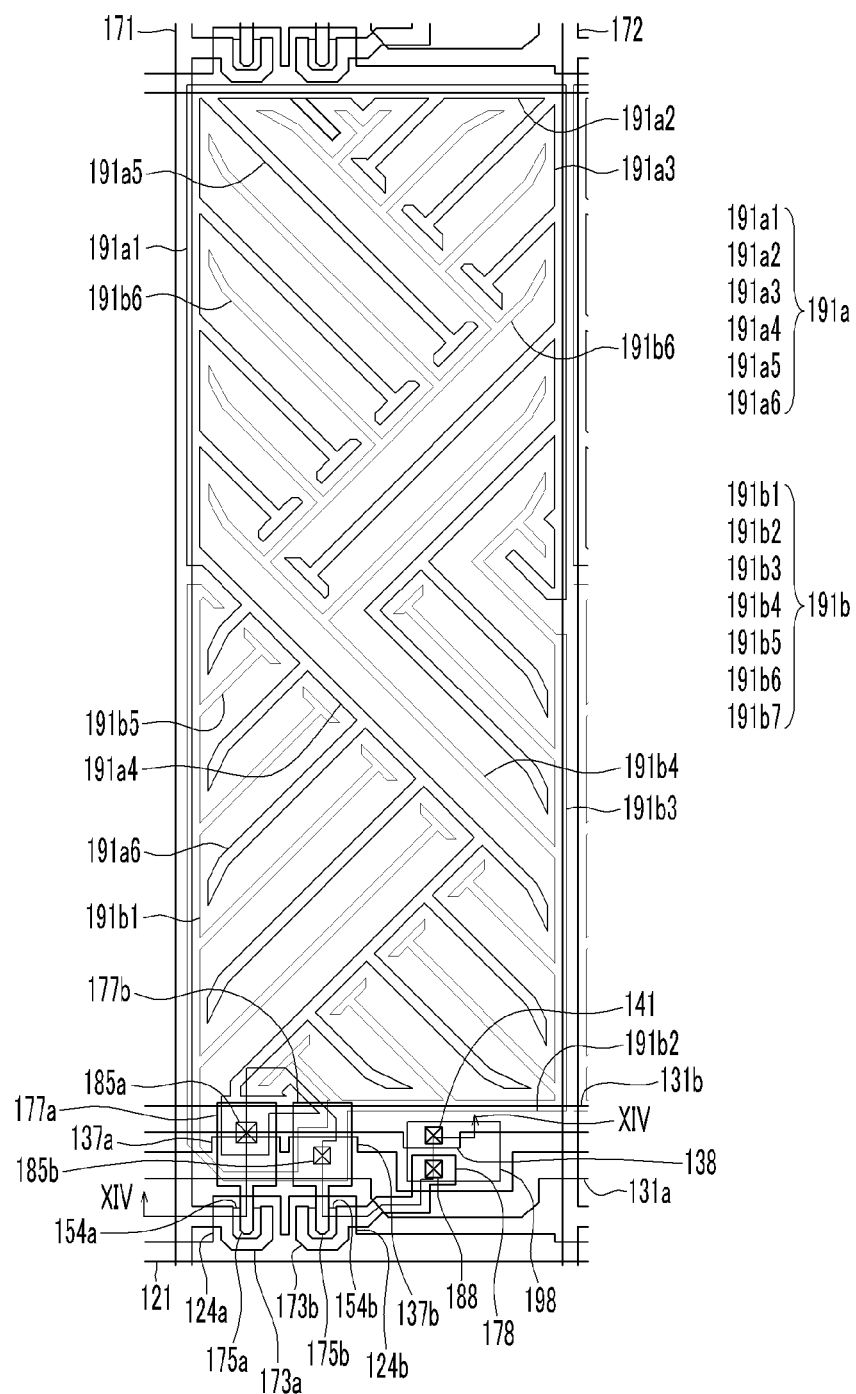
FIG. 13 is a plan view illustrating a layout of yet another alternative exemplary embodiment of a liquid crystal panel assembly according to the present invention.
Figure 14:
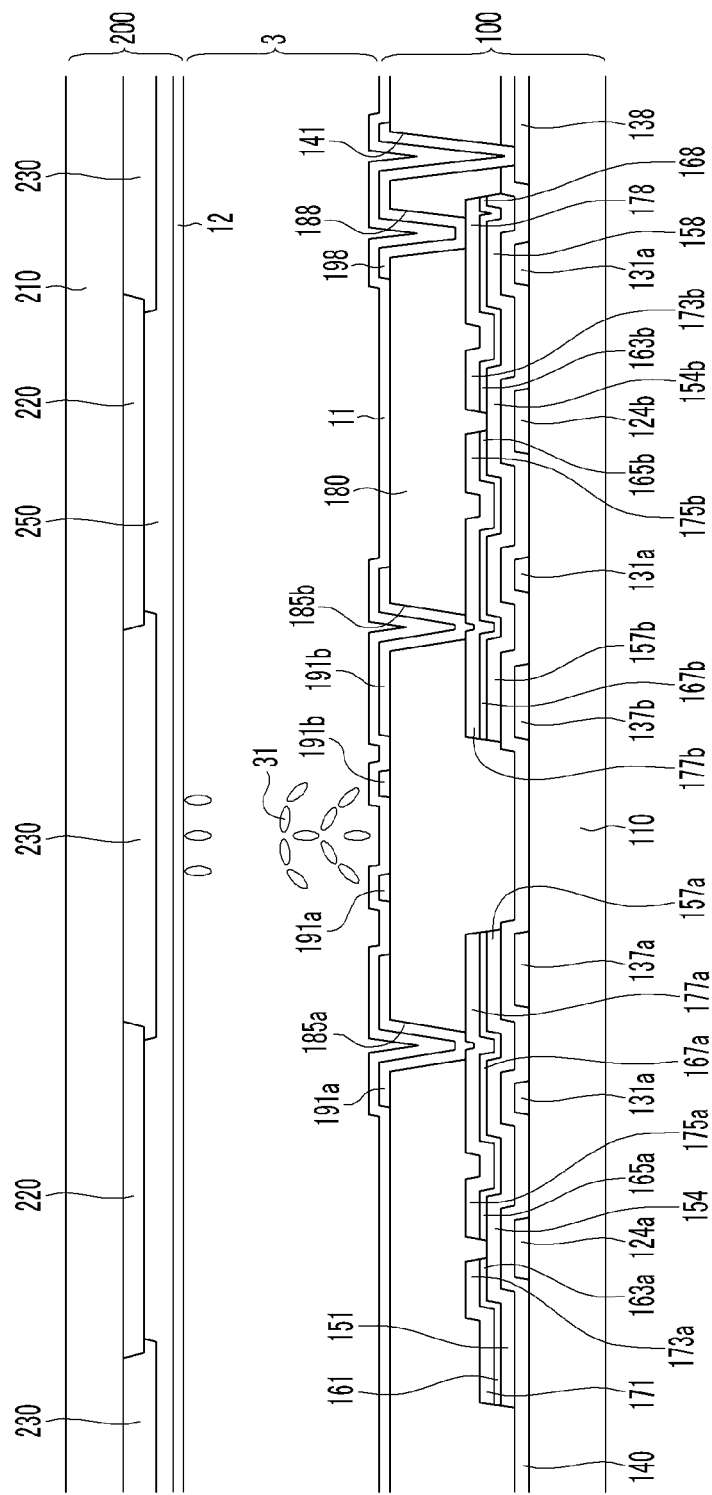
FIG. 14 is a partial cross-sectional view taken along line XIV-XIV of FIG. 13.

FIG. 13 is a plan view illustrating a layout of a liquid crystal panel assembly according to still another alternative exemplary embodiment of the present invention, and FIG. 14 is a partial cross-sectional view taken along line XIV-XIV of FIG. 13.

The liquid crystal panel assembly according to an exemplary embodiment includes a lower panel 100 and an upper panel 200 facing each other, and a liquid crystal layer 3 interposed between the display panels 100 and 200.

The layered structure of an exemplary embodiment of the liquid crystal panel assembly shown in FIG. 13 is substantially similar to layered structures of exemplary embodiments of the liquid crystal panel assembly shown in FIGS. 7, 9, and 11.

Referring again to the lower panel 100, the gate line 121, the storage electrode line 131*a*, and the common voltage line 131*b* are disposed on the substrate 110. The gate line 121 includes the first gate electrode 124*a* and the second gate electrode 124*b*, the storage electrode line 131 includes the first storage electrode 137*a* and the second storage electrode 137*b*, and the common voltage line 131*b* includes common electrodes 138 extending downward.

A gate insulating layer 140, semiconductor stripes 151 including protrusions 154*a* and expansions 157*a*, semiconductor islands 154*b* including expansions 158 and 157*b*, ohmic contact stripes 161 including protrusions 163*a*, and ohmic contact islands 165*a*, 163*b*, and 165*b* including expansions 168, 167*a*, and 167*b* are disposed on the gate lines 121, the storage electrode line 131*a*, and the common voltage line 131*b*.

The first data line 171 including the first source electrode 173*a*, the second data line 172 adjacent to the first data line 171, a first drain electrode 175*a* including a first storage conductor 177a, a second source electrode 173b including expansion 178, and a second drain electrode 175b including a second storage conductor 177b are disposed on the ohmic contacts 161, 163b, 165a, 165b, 168, 167a, and 167b, and a passivation layer 180 is disposed thereon.

The gate insulating layer 140 and the passivation layer 180 include contact holes 141 exposing the common electrode 138, for example, the first contact hole 185a, the second contact hole 185b, and the third contact hole 188 respectively exposing the first drain electrode 175a, the second drain electrode 175b, and an expansion 178 of the second source electrode 173b.

A pixel of the liquid crystal panel assembly includes an upper portion, disposed above an imaginary transverse central line of the pixel (not shown), and a lower portion, disposed below the imaginary transverse central line of the pixel.

A pixel electrode 191 including subpixel electrodes, e.g., a first subpixel electrode 191a and a second subpixel electrode 191b, and a connecting member 198, is disposed on the passivation layer 180.

The overall outer shape of a pixel electrode 191 is a quadrangle.

The first subpixel electrode 191a includes a first upper portion and a first lower portion. More specifically, the first subpixel electrode 191a includes a first upper longitudinal stem 191a1 overlapping the first data line 171 disposed on the upper portion of the pixel, a second upper longitudinal stem 191a3 overlapping the second data line 172 disposed on the upper portion of the pixel, a first upper transverse stem 191a2 connected to the first upper longitudinal stem 191a1 and the second upper longitudinal stem 191a3, a first lower oblique stem 191a4 substantially obliquely extended from the first longitudinal stem 191a1 in a right downward direction, first lower branches 191a5 extended from the first upper longitudinal stem 191a1, the first upper transverse stem 191a2 and the second upper longitudinal stem 191a3, and first upper branches 191a6 extended from the first lower oblique stem 191a4. The first oblique stem 191a4, the first branches 191a5, and the second branches 191a6 may form an angle of about 45 degrees with the gate line 121.

The second subpixel electrode 191b includes a second upper portion and a second lower portion. More specifically, the second subpixel electrode 191b includes a first lower longitudinal stem 191b1 overlapping the first data line 171 disposed on the lower portion of the pixel, the second lower longitudinal stem 191b3 overlapping the second data line 172 disposed on the lower portion of the pixel, a second lower transverse stem 191b2 connected to the first longitudinal stem 191b1 and the second lower longitudinal stem 191b3, a second upper oblique stem 191b4 substantially obliquely extended from the first lower longitudinal stem 191b1 in a right downward direction, second lower branches 191b5 extended from the first lower longitudinal stem 191b1, the second lower transverse stem 191b2, and the second lower longitudinal stem 191b3, and second upper branches 191b6 extended from the second upper oblique stem 191b4. The second upper oblique stem 191b4, the second lower branches 191b5, and the second upper branches 191b6 may form an angle of about 45 degrees with the gate line 121.

In an exemplary embodiment, an overlapping area of the first data line 171 and the first upper longitudinal stem 191a1 of the first subpixel electrode 191a may be substantially equal to an overlapping area of the first data line 171 and the first lower longitudinal stem 191b1 of the second subpixel electrode 191b, and an overlapping area of the second data line 172 and the second upper longitudinal stem 191a3 of the first subpixel electrode 191a is substantially equal to an overlapping area of the second data line 172 and the second lower longitudinal stem 191b3 of the second subpixel electrode 191b.

The first upper and lower branches of the first subpixel electrodes 191a and the second upper and lower branches of the second subpixel electrodes 191b are alternately disposed by engaging the upper and lower branches of the first subpixel electrodes 191a with the upper and lower branches of the second subpixel electrodes 191b respectively with a predetermined gap therebetween, and thereby formed in a pectinated pattern, e.g., in an interdigitated or interlaced, comb-like pattern.

The first subpixel electrode 191a is connected to the first drain electrode 175a through the first contact hole 185a, and thereby receives the data voltage from the first drain electrode 175a. The second subpixel electrode 191b is connected to the second drain electrode 175b through the second contact hole 185b, and thereby receives the common voltage Vcom from the second source electrode 173b connected to the common electrode 138 through the connecting member 198.

In an exemplary embodiment, when the overlapping area of the first data line 171 and the upper first longitudinal stem 191a1 of the first subpixel electrode 191a is substantially equal to the overlapping area of the first data line 171 and the first lower longitudinal stem 191b1 of the second subpixel electrode 191b, the parasitic capacitance between the first subpixel electrode 191a and the first data line 171 may be substantially equal to the parasitic capacitance between the second subpixel electrode 191b and the first data line 171. Even when the first data line 171 receives a data voltage whose polarities are inverted every frame, an amount of a charging voltage drop at the first subpixel electrode 191a due to the parasitic capacitance between the first subpixel electrode 191a and the first data line 171 may be substantially equal to an amount of a charging voltage drop at the second subpixel electrode 191b due to the parasitic capacitance between the second subpixel electrode 191b and the first data line 171. Accordingly, a voltage difference between the first subpixel electrode 191a and the second subpixel electrode 191b is substantially uniform, and thereby a uniform charging voltage is substantially maintained.

In an exemplary embodiment, when the overlapping area of the second data line 172 and the second upper longitudinal stem 191a3 of the first subpixel electrode 191a is substantially equal to the overlapping area of the second data line 172 and the second lower longitudinal stem 191b3 of the second subpixel electrode 191b, the parasitic capacitance between the first subpixel electrode 191a and the second data line 172 may be substantially equal to the parasitic capacitance between the second subpixel electrode 191b and the second data line 172. Even when the second data line 172 receives a data voltage whose polarities are inverted every frame, the amount of the charging voltage drop at the first subpixel electrode 191a due to the parasitic capacitance between the first subpixel electrode 191a and the second data line 172 may be substantially equal to the amount of the charging voltage drop at the second subpixel electrode 191b due to the parasitic capacitance between the second subpixel electrode 191b and the second data line 172. Accordingly, the voltage difference between the first subpixel electrode 191a and the second subpixel electrode 191b is substantially uniform, and thereby the uniform charging voltage is substantially maintained.

In an exemplary embodiment, the first subpixel electrode 191a and the second subpixel electrode 191b, overlap the two data lines 171 and 172 and the aperture ratio of the liquid crystal display is thereby substantially increased.

In an exemplary embodiment, the first storage electrode 137a and the second storage electrode 137b overlap the first storage conductor 177a and the second storage conductor 177b respectively via the gate insulating layer 140 and the semiconductor layers 157a, 157b, 167a, and 167b, thereby forming the first storage capacitor Csta1 and the third storage capacitor Cstb1. The common voltage line 131b overlaps the first storage conductor 177a and the second storage conductor 177b via the gate insulating layer 140 and the semiconductor layers 157a, 157b, 167a, and 167b, thereby forming the second storage capacitor Csta2 and the fourth storage capacitor Cstb2. In an exemplary embodiment, an overlapping area of the first storage electrode 137a and the first storage conductor 177a forming the first storage capacitor Csta1 may be substantially equal to an overlapping area of the second storage electrode 137b and the second storage conductor 177b forming the third storage capacitor Cstb1, and an overlapping area of the common voltage line 131b and the first storage conductor 177a forming the second storage capacitor Csta2 may be substantially equal to an overlapping area of the common voltage line 131b and the second storage conductor 177b forming the fourth storage capacitor Cstb2.

In an exemplary embodiment, the first storage capacitor Csta and the second storage capacitor Cstb may be formed by using the gate conductor and the data conductors without an additional process for forming the first storage capacitor Csta and the second storage capacitor, and the manufacturing process of the liquid crystal display is thereby substantially simplified. The gate insulating layer 140 and the semiconductor layers 157a, 157b, 167a, and 167b may be disposed between the two terminals of the first storage capacitor Csta and the second storage capacitor Cstb, the capacitance of the first storage capacitor Csta and the second storage capacitor Cstb is thereby substantially increased compared to the case that the passivation layer 180 is disposed between the two terminals the first storage capacitor Csta and the second storage capacitor Cstb.

In an exemplary embodiment, when the overlapping area of the first storage electrode 137a and the first storage conductor 177a forming the first storage capacitor Csta1 is substantially equal to the overlapping area of the second storage electrode 137b and the second storage conductor 177b forming the third storage capacitor Cstb1, and the overlapping area of the common voltage lines 131b and the first storage conductor 177a forming the second storage capacitor Csta2 is substantially equal to the overlapping area of the common voltage lines 131b and the second storage conductor 177b forming the fourth storage capacitor Cstb2, the capacitances thereof may be substantially equal to each other. Even when the storage capacitors are formed by overlapping the first storage conductor 177a and the second storage conductor 177b that receive the voltages whose polarities are inverted every frame, and the first storage electrode 137a and the second storage electrode 137b and common voltage lines 131b via the semiconductor layer 157a, 157b, 167a, and 167b, the capacitances thereof may be substantially equal to each other, and the voltage of the liquid crystal capacitor Clc is thereby substantially uniformly maintained.

An exemplary embodiment of a liquid crystal display will now be described in further detail with reference to FIG. 15 and FIG. 16.

Figure 15:
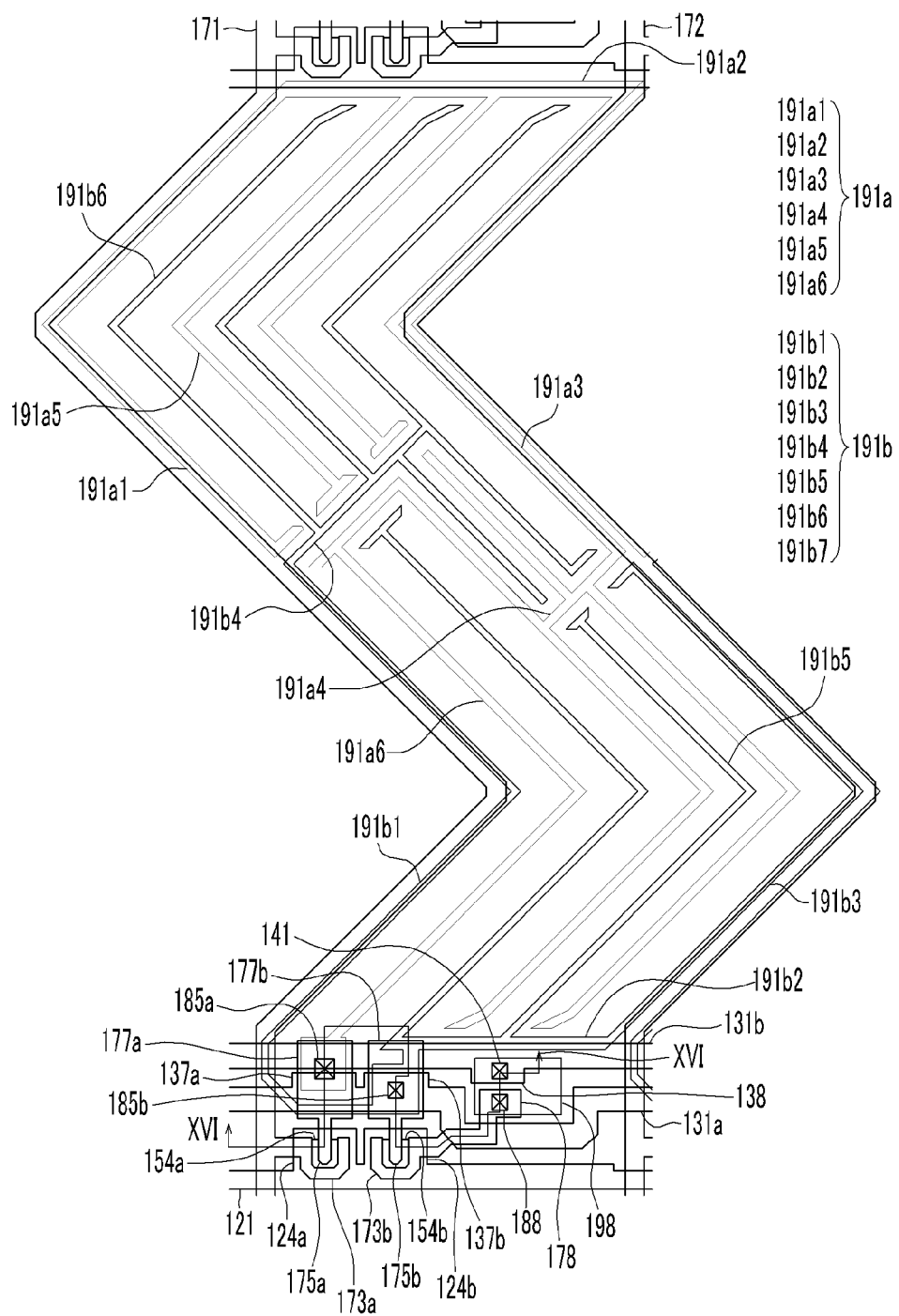
FIG. 15 is a plan view illustrating a layout of still another alternative exemplary embodiment of a liquid crystal panel assembly according to the present invention.
Figure 16:
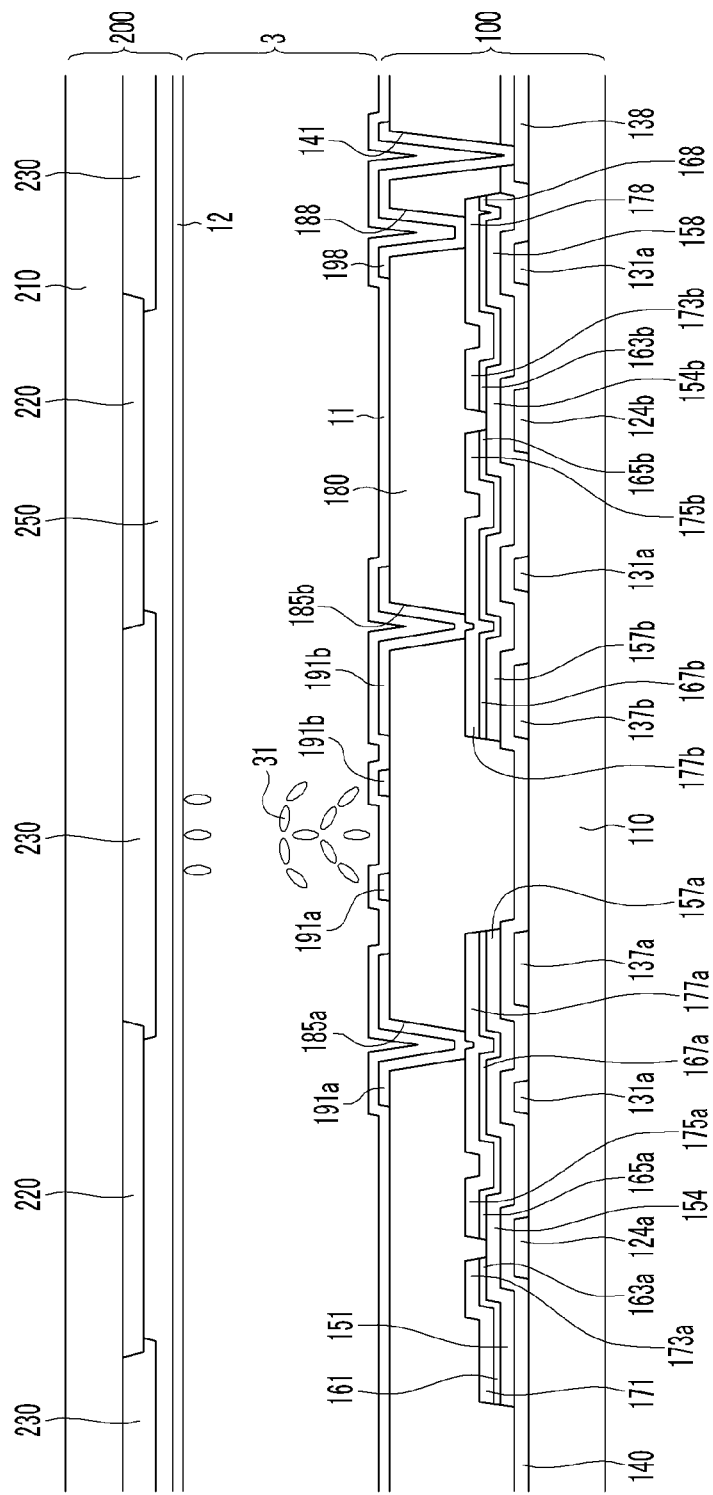
FIG. 16 is a partial cross-sectional view taken along line XVI-XVI of FIG. 15.

FIG. 15 is a plan view illustrating a layout of a liquid crystal panel assembly according to still another alternative exemplary embodiment of the present invention, and FIG. 16 is a partial cross-sectional view taken along line XVI-XVI of FIG. 15.

A liquid crystal display according to an exemplary embodiment of the present invention includes display panels, for example, a lower panel 100 and an upper panel 200 facing each other, and a liquid crystal layer 3 interposed between the display panels 100 and 200.

A layered structure of the liquid crystal panel assembly according to the present exemplary embodiment is substantially similar to the layered structure of the liquid crystal panel assembly in FIG. 13 and FIG. 14.

Referring again to the lower panel 100, a gate line 121, a storage electrode line 131a, and a common voltage line 131b are disposed on the substrate 110.

A gate insulating layer 140, semiconductor layers, for example, semiconductor stripes 151 including protrusions 154a and expansions 157a, semiconductor islands 154b including expansions 158 and 157b, and ohmic contacts, for example, ohmic contact stripes 161 including protrusions 163a and ohmic contact islands 165a, 163b, and 165b including expansions 168, 167a, and 167b, are disposed on the gate line 121, the storage electrode line 131a, and the common voltage line 131b.

A first data line 171 including a first source electrode 173a, a second data line 172 adjacent to the first data line 171, a first drain electrodes 175a including a first storage conductor 177a, a second source electrode 173b including expansions 178, and a second drain electrode 175b including a second storage conductor 177b are disposed on the ohmic contacts 161, 163b, 165a, 165b, 168, 167a, and 167b, and a passivation layer 180 is disposed thereon.

The gate insulating layer 140 and the passivation layer 180 include contact holes 141 exposing the common electrode 138, and the passivation layer 180 includes a first contact hole 185a, a second contact hole 185b, and a third contact hole 188 respectively exposing the first drain electrode 175a, the second drain electrode 175b, and the expansions 178 of the second source electrode 173b.

A pixel electrode 191 including a pair of subpixel electrodes, for example, a first subpixel electrode 191a and a second subpixel electrode 191b, and a connecting member 198, are disposed on the passivation layer 180.

In an exemplary embodiment, the first data line 171 and the second data line 172 include curved portions and longitudinal portions that are substantially alternately connected to each other, and are substantially periodically curved. The curved portions include a pair of oblique portions that are connected to each other in a chevron-like shape, and the oblique portions may form an angle of about 45 degrees with the gate lines 121.

As shown in FIG. 15, the overall outer shape of one pixel electrode 191 includes a pair of curved edges substantially parallel to curved portions of the data lines 171 and 172, and transverse edges and longitudinal edges substantially parallel to the gate lines 121 and the data lines 171 and 172, and is in a chevron-like shape.

The first subpixel electrode 191a includes a first upper portion and a second upper portion. More specifically, the first subpixel electrode 191a includes a first supper longitudinal stem 191a1 overlapping the first data line 171 disposed on the upper portion of the pixel, the second upper longitudinal stem 191a3 overlapping the second data line 172 disposed on the upper portion of the pixel, a first upper transverse stem 191a2 connected to the first longitudinal stem 191a1 and the second upper longitudinal stem 191a3, a first lower oblique stem 191a4 substantially obliquely extended from the second upper longitudinal stem 191a3 in a left downward direction, first upper branches 191a5 extended from the first upper transverse stem 191a2, and first lower branches 191a6 extended from the oblique stem 191a4. The oblique stem 191a4, the first branches 191a5, and the first lower branches 191a6 may form an angle of about 45 degrees with the gate line 121.

The second subpixel electrode 191b has a first lower longitudinal stem 191b1 overlapping the first data line 171 disposed on the lower portion of the pixel, a second lower longitudinal stem 191b3 overlapping the second data line 172 disposed on the lower portion of the pixel, a second lower transverse stem 191b2 connected to the first lower longitudinal stem 191b1 and the second lower longitudinal stem 191b3, a second upper oblique stem 191b4 substantially obliquely extended from the first lower longitudinal stem 191b1 in a right upward direction, second lower branches 191b5 extended from the second lower transverse stem 191b2, and second upper branches 191b6 extended from the oblique stem 191b4. The second upper oblique stem 191b4, the second lower branches 191b5, and the second upper branches 191b6 may form an angle of about 45 degrees with the gate line 121.

The first subpixel electrode 191a is connected to the first drain electrode 175a through the first contact hole 185a, and thereby receives the data voltage from the first drain electrode 175a. The second subpixel electrode 191b is connected to the second drain electrode 175b through the second contact hole 185b, and thereby receives the common voltage Vcom transmitted from the second source electrode 173b connected to the common electrode 138 through the connecting member 198.

In an exemplary embodiment, an overlapping area of the first data line 171 and the first upper longitudinal stem 191a1 of the first subpixel electrode 191a may be substantially equal to an overlapping area of the first data line 171 and the first lower longitudinal stem 191b1 of the second subpixel electrode 191b, and an overlapping area of the second data line 172 and the second upper longitudinal stem 191a3 of the first subpixel electrode 191a may be substantially equal to an overlapping area of the second data line 172 and the second lower longitudinal stem 191b3 of the second subpixel electrode 191b.

In an exemplary embodiment, the first storage electrode 137a and the second storage electrode 137b overlap the first storage conductor 177a and the second storage conductor 177b respectively via the gate insulating layer 140 and the semiconductor layers 157a, 157b, 167a, and 167b, thereby forming the first storage capacitor Csta1 and the third storage capacitor Cstb1. The common voltage line 131b, overlaps first storage conductor 177a and the second storage conductor 177b via the gate insulating layer 140 and the semiconductor layers 157a, 157b, 167a, and 167b, thereby forming the second storage capacitor Csta2 and the fourth storage capacitor Cstb2. In an exemplary embodiment, an overlapping area of the first storage electrode 137a and the first storage conductor 177a forming the first storage capacitor Csta1 may be substantially equal to an overlapping area of the second storage electrode 137b and the second storage conductor 177b forming the third storage capacitor Cstb1, and that the overlapping area of the common voltage line 131b and the first storage conductor 177a forming the second storage capacitor Csta2 may be substantially equal to an overlapping area of the common voltage lines 131b and the second storage conductor 177b forming the fourth storage capacitor Cstb2.

In an exemplary embodiment, when the overlapping area of the first data line 171 and the first upper longitudinal stem 191a1 of the first subpixel electrode 191a is substantially equal to the overlapping area of the first data line 171 and the first lower longitudinal stem 191b1 of the second subpixel electrode 191b, the parasitic capacitance between the first subpixel electrode 191a and the first data line 171 may be substantially equal to the parasitic capacitance between the first subpixel electrode 191a and the first data line 171. Even when the first data line 171 receives a data voltage whose polarities are inverted every frame, the amount of the charging voltage drop at the first subpixel electrode 191a due to the parasitic capacitance between the first subpixel electrode 191a and the first data line 171 may be substantially equal to the amount of the charging voltage drop at the second subpixel electrode 191b due to the parasitic capacitance between the second subpixel electrode 191b and the first data line 171. Accordingly, the voltage magnitude between the first subpixel electrode 191a and the second subpixel electrode 191b is substantially uniform, and thereby the uniform charging voltage is effectively maintained.

In an exemplary embodiment, when the overlapping area of the second data line 172 and the second upper longitudinal stem 191a3 of the first subpixel electrode 191a is substantially equal to the overlapping area of the second data line 172 and the second lower longitudinal stem 191b3 of the second subpixel electrode 191b, the parasitic capacitance between the first subpixel electrode 191a and the second data line 172 may be substantially equal to the parasitic capacitance between the second subpixel electrode 191b and the second data line 172. Even when the second data line 172 receives the data voltage whose polarities are inverted every frame, the amount of the charging voltage drop at the first subpixel electrode 191a due to the parasitic capacitance between the first subpixel electrode 191a and the second data line 172 and the amount of the charging voltage drop at the second subpixel electrode 191b due to the parasitic capacitance between the second subpixel electrode 191b and the second data line 172 are substantially equal to each other. Accordingly, the voltage difference between the first subpixel electrode 191a and the second subpixel electrode 191b is substantially uniform, and thereby the uniform charging voltage is effectively maintained.

In an exemplary embodiment, the first subpixel electrode 191a and the second subpixel electrode 191b and two data lines 171 and 172 overlap each other, and the aperture ratio of the liquid crystal display is thereby substantially increased.

In an exemplary embodiment, the first storage capacitor Csta and the second storage capacitor Cstb are formed by using the gate conductor and the data conductors without an additional process for forming the first storage capacitor Csta and the second storage capacitor, and the manufacturing process of the liquid crystal display is thereby substantially simplified. When the gate insulating layer 140 and the semiconductor layers 157a, 157b, 167a, and 167b are disposed between the two terminals of the first storage capacitor Csta and the second storage capacitor Cstb, the capacitance of the first storage capacitor Csta and the second storage capacitor Cstb are substantially increased compared to the case that the passivation layer 180 is disposed between the two terminals of the first storage capacitor Csta and the second storage capacitor Cstb.

In an exemplary embodiment, when the overlapping area of the first storage electrode 137a and the first storage conductor 177a forming the first storage capacitor Csta1 is substantially equal to the overlapping area of the second storage electrode 137b and the second storage conductor 177b forming the second storage capacitor Cstb1, and the overlapping area of the common voltage lines 131b and the first storage conductor 177a forming the second storage capacitor Csta2 is substantially equal to the overlapping area of the common voltage line 131b and the second storage conductor 177b forming the fourth storage capacitor Cstb2, the capacitances thereof may be substantially equal to each other. Accordingly, although the storage capacitors are formed by overlapping the first storage conductor 177a and the second storage conductor 177b that receives the voltages whose polarities are inverted every frame, and the first storage electrode 137a and the second storage electrode 137b and common voltage line 131b via the semiconductor layer 157a, 157b, 167a, and 167b, the capacitances of the first storage capacitor Csta and the second storage capacitor Cstb may be substantially equal to each other, and the voltage of the liquid crystal capacitor Clc is thereby substantially uniformly maintained.

According to exemplary embodiments of the present invention as described herein provide advantages which include, but are not limited to, a high contrast ratio and a wide viewing angle, fast response speed of the liquid crystal molecule, substantially increased aperture ratio, and effectively preventing the crosstalk due to the increasing of the parasitic capacitance between the signal line and the pixel electrode.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
a first substrate;
a second substrate disposed opposite the first substrate;
a liquid crystal layer interposed between the first substrate and the second substrate and including liquid crystal molecules;
a gate line disposed on the first substrate and which transmits a gate signal;
a first data line disposed on the first substrate and which transmits a first data voltage;
a second data line disposed on the first substrate and which transmits a second data voltage;
a first switching element connected to the gate line and the first data line;
a second switching element connected to the gate line and the second data line;
a first subpixel electrode connected to the first switching element; and
a second subpixel electrode connected to the second switching element,
wherein
a polarity of the first data voltage with respect to a reference voltage is opposite to a polarity of the second data voltage with respect to the reference voltage,
the first subpixel electrode overlaps a first portion of the first data line and a first portion of the second data line,
the second subpixel electrode overlaps a second portion of the first data line and a second portion of the second data line,
the first subpixel electrode includes first branches,
the second subpixel electrode includes second branches, and
the first branches and the second branches are alternately arranged between the first data line and the second data line.

2. The liquid crystal display of claim 1, wherein
an overlapping area of the first subpixel electrode and the first data line is substantially equal to an overlapping area of the first subpixel electrode and the second data line, and
an overlapping area of the second subpixel electrode and the first data line is substantially equal to an overlapping area of the second subpixel electrode and the second data line.

3. The liquid crystal display of claim 2, wherein
the first subpixel electrode includes a first upper portion disposed above the gate line and a first lower portion disposed below the gate line,
the second subpixel electrode includes a second upper portion disposed above the gate line and a second lower portion disposed below the gate line,
the first portion of the first data line is in one of the first upper portion and the first lower portion of the first subpixel electrode, and the first portion of the second data line is in the other of the first upper portion and the first lower portion of the first subpixel electrode, and
the second portion of the first data line is in one of the second upper portion and the second lower portion of the second subpixel electrode, and the second portion of the second data line is in the other of the second upper portion and the second lower portion of the second subpixel electrode.

4. The liquid crystal display of claim 3, further comprising
a passivation layer disposed on the first substrate between the first switching element and the second switching element,
wherein the passivation layer includes a first contact hole formed therein which exposes an output terminal of the first switching element, and a second contact hole formed therein which exposes an output terminal of the second switching element,
the first upper portion of the first subpixel electrode, the first lower portion of the first subpixel electrode and the first switching element are connected through the first contact hole, and
the second upper portion of the of the second subpixel electrode, the second lower portion of the second subpixel electrode and the second switching element are connected through the second contact hole.

5. The liquid crystal display of claim 3, wherein
the first subpixel electrode includes upper and lower portions that are separated from each other;
the passivation layer includes a third contact hole formed therein which further exposes the output terminal of the first switching element,
one of the first upper portion and the first lower portion of the first subpixel electrode is connected to the first switching element through the first contact hole, and
the other of the first upper portion and the first lower portion of the first subpixel electrode is connected to the output terminal of the first switching element through the third contact hole.

6. The liquid crystal display of claim 2, further comprising:
a storage electrode disposed on a same layer of the first substrate on which the gate line is disposed;
a first storage conductor extending from the output terminal of the first switching element; and
a second storage conductor extending from the output terminal of the second switching element,
wherein the first storage conductor and the second storage conductor overlap the storage electrode, and form a first storage capacitor and a second storage capacitor, respectively.

7. The liquid crystal display of claim 6, further comprising an insulating layer and a semiconductor layer disposed on the first substrate between the first storage conductor and the storage electrode, and between the second storage conductor and the storage electrode.

8. The liquid crystal display of claim 7, wherein
an overlapping area of the first storage conductor and the storage electrode is substantially equal to an overlapping area of the second storage conductor and the storage electrode.

9. The liquid crystal display of claim 2, wherein
the first subpixel electrode includes a first upper portion disposed above the gate line and a first lower portion disposed below the gate line,
the second subpixel electrode includes a second upper portion disposed above the gate line and a second lower portion disposed below the gate line,
the first portion of the first data line and the first portion of the second data line are in one of the first upper portion and the first lower portion of the first subpixel electrode, and
the second portion of the first data line and the second portion of the second data line are in one portion of the second upper portion and the second lower portion of the second subpixel electrode.

10. The liquid crystal display of claim 9, further comprising
a passivation layer disposed on the first substrate between the first switching element and the second switching element, wherein the passivation layer includes a first contact hole formed therein which exposes an output terminal of the first switching element, and a second contact hole formed therein which exposes an output terminal of the second switching element,
the first upper portion of the first subpixel electrode, the first lower portion of the first subpixel electrode and the first switching element are connected through the first contact hole, and
the second upper portion of the second subpixel electrode, the second lower portion and the second switching element are connected through the second contact hole.

11. The liquid crystal display of claim 10, further comprising:
a storage electrode disposed on a same layer of the first substrate on which the gate line is disposed;
a first storage conductor extending from the output terminal of the first switching element; and
a second storage conductor extending from the output terminal of the second switching element,
wherein the first storage conductor and the second storage conductor overlap the storage electrode, and form a first storage capacitor and a second storage capacitor, respectively.

12. The liquid crystal display of claim 11, wherein
the first contact hole of the passivation layer is disposed above the first storage conductor, and the second contact hole of the passivation layer is disposed above the second storage conductor.

13. The liquid crystal display of claim 11, further comprising
an insulating layer and a semiconductor layer disposed on the first substrate between the first storage conductor and the storage electrode, and between the second storage conductor and the storage electrode.

14. The liquid crystal display of claim 11, wherein
an overlapping area of the first storage conductor and the storage electrode is substantially equal to an overlapping area of the second storage conductor and the storage electrode.

15. The liquid crystal display of claim 2, wherein
the liquid crystal layer includes liquid crystals having positive dielectric anisotropy, and
the liquid crystals of the liquid crystal layer are aligned substantially vertically between the first substrate and the second substrate.

16. The liquid crystal display of claim 2, wherein
the first branches of the first subpixel electrode and the second branches of the second subpixel electrode are arranged substantially obliquely with respect to a direction along which the gate line is longitudinally aligned.

17. The liquid crystal display of claim 2, wherein
the first subpixel electrode and the second subpixel electrode are disposed on a same layer of the first substrate.

* * * * *